United States Patent
Farrar et al.

(10) Patent No.: US 7,152,906 B1
(45) Date of Patent: Dec. 26, 2006

(54) QUICK CHANGE WINDOW ASSEMBLY

(75) Inventors: Jerry Farrar, Banning, CA (US); Dale Carson, Murrieta, CA (US)

(73) Assignee: Transit Care, Inc., Panorama City, CA (US)

( * ) Notice: Subject to any disclaimer, the term of this patent is extended or adjusted under 35 U.S.C. 154(b) by 148 days.

(21) Appl. No.: 11/086,042

(22) Filed: Mar. 22, 2005

Related U.S. Application Data

(63) Continuation-in-part of application No. 10/684,142, filed on Oct. 10, 2003, now Pat. No. 6,869,128.

(60) Provisional application No. 60/418,385, filed on Oct. 11, 2002.

(51) Int. Cl.
*B60J 1/10* (2006.01)

(52) U.S. Cl. .................. 296/146.15; 52/208; 52/204.5

(58) Field of Classification Search ........... 296/146.15, 296/201, 1.04; 52/204.591, 208, 204.5
See application file for complete search history.

(56) References Cited

U.S. PATENT DOCUMENTS

| | | | |
|---|---|---|---|
| 3,846,948 A | 11/1974 | Dallen | |
| 4,134,240 A | 1/1979 | Bologna et al. | |
| 4,723,809 A | 2/1988 | Kida et al. | |
| 4,799,344 A | 1/1989 | Francis | |
| 4,800,681 A | 1/1989 | Skillen et al. | |
| 5,085,021 A | 2/1992 | Kunert | |
| 5,131,194 A * | 7/1992 | Anderson | 52/204.595 |
| 5,137,770 A | 8/1992 | Rothe et al. | |
| 5,509,711 A | 4/1996 | Gold | |
| 5,529,366 A | 6/1996 | Gold | |
| 5,613,325 A | 3/1997 | Mariel | |
| 5,635,281 A | 6/1997 | Agrawal | |
| 5,702,148 A | 12/1997 | Vaughan et al. | |
| 5,735,089 A * | 4/1998 | Smith et al. | 52/208 |
| 5,893,600 A | 4/1999 | McManus | |
| 6,012,257 A * | 1/2000 | Caplette | 52/204.593 |
| 6,158,372 A | 12/2000 | Erskine | |
| 6,205,723 B1 * | 3/2001 | Farrar et al. | 52/208 |
| 6,206,453 B1 * | 3/2001 | Farrar et al. | 296/146.15 |
| 6,263,627 B1 | 7/2001 | Schonenbach et al. | |
| 6,286,891 B1 | 9/2001 | Gage et al. | |
| 6,312,043 B1 | 11/2001 | Blackburn | |
| 6,394,529 B1 | 5/2002 | Davis et al. | |
| 6,408,574 B1 * | 6/2002 | Farrar et al. | 52/204.5 |
| 6,412,225 B1 | 7/2002 | McManus | |
| 6,419,298 B1 * | 7/2002 | Farrar et al. | 296/146.15 |
| 6,425,215 B1 * | 7/2002 | Farrar | 296/146.15 |
| 6,460,917 B1 | 10/2002 | De Paoli | |
| 6,490,788 B1 | 12/2002 | Carter et al. | |
| 6,585,311 B1 * | 7/2003 | Farrar et al. | 296/146.15 |
| 6,688,044 B1 * | 2/2004 | Farrar et al. | 52/204.5 |

(Continued)

*Primary Examiner*—Kiran B. Patel
(74) *Attorney, Agent, or Firm*—Jeffer, Mangels, Butler & Marmaro, LLP

(57) ABSTRACT

A window assembly for a public transportation vehicle that permits rapid removal and replacement is disclosed. The vehicle has a sidewall with a window opening. One or more frame members are attached within the window opening. The frame members are adapted to comprise one or more apertures. One or more retainers are adhesively attached to the inner surface and towards the outer periphery of a piece of glazing. The retainers have protrusions that can extend through the apertures in the frame members and engage therewith when the piece of glazing is positioned adjacent to the window opening. Removable fasteners can be attached to the protrusions so as to detachably secure the piece of glazing and the retainers to the frame members. This allows easy removal and replacement of the piece of glazing from the window opening of the sidewall of the vehicle.

9 Claims, 14 Drawing Sheets

U.S. PATENT DOCUMENTS

| | | |
|---|---|---|
| 6,691,464 B1 | 2/2004 | Nestell et al. |
| 6,871,902 B1 * | 3/2005 | Carson et al. ......... 296/146.15 |
| 7,021,006 B1 * | 4/2006 | Farrar et al. ............... 52/204.5 |
| 7,082,736 B1 * | 8/2006 | Farrar et al. ............. 52/204.53 |
| 2001/0032422 A1 | 10/2001 | Farrar |
| 2002/0003356 A1 | 1/2002 | Davis et al. |
| 2003/0070371 A1 * | 4/2003 | Kobrehel ................... 52/204.5 |
| 2004/0128924 A1 * | 7/2004 | Kobrehel et al. ............. 52/203 |
| 2006/0000162 A1 * | 1/2006 | Choby et al. ................. 52/202 |
| 2006/0021290 A1 * | 2/2006 | Kobrehel et al. ............. 52/202 |

* cited by examiner

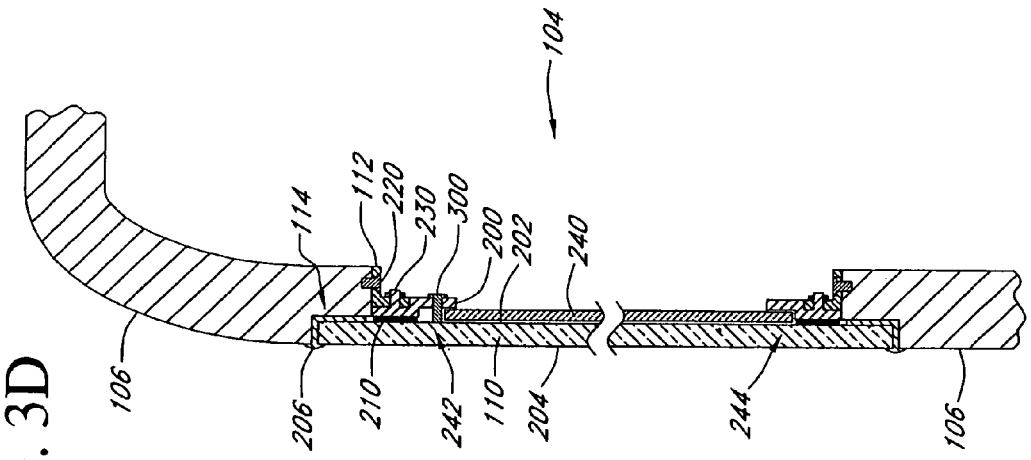
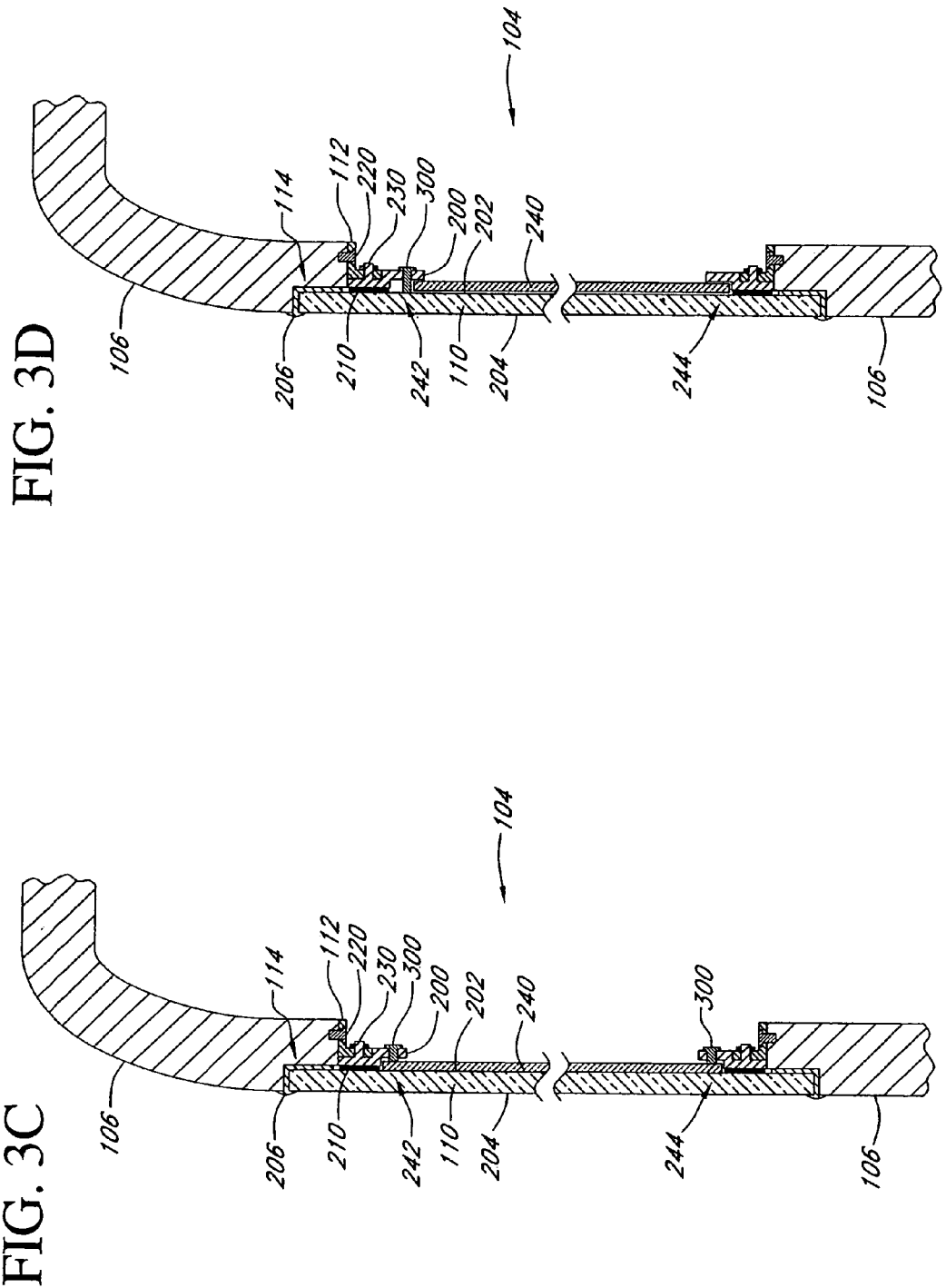

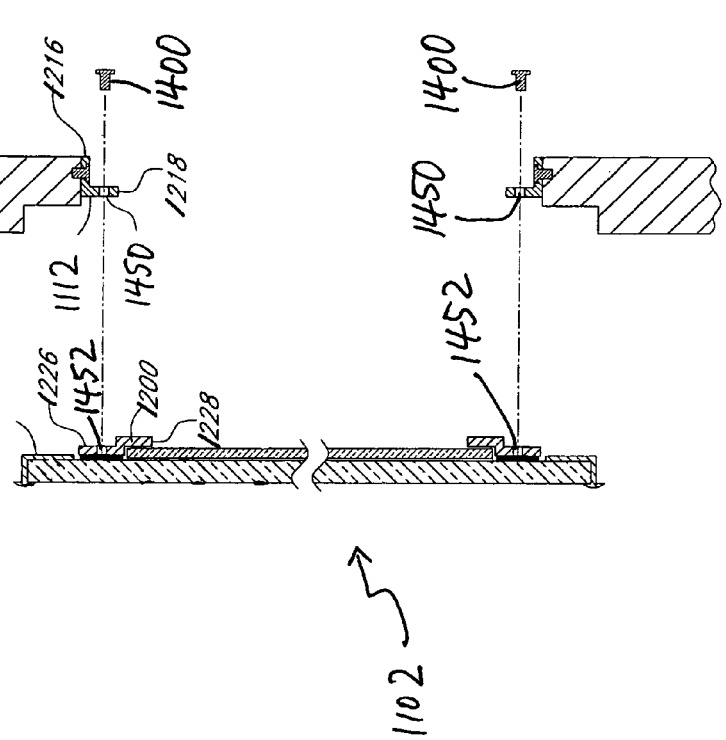
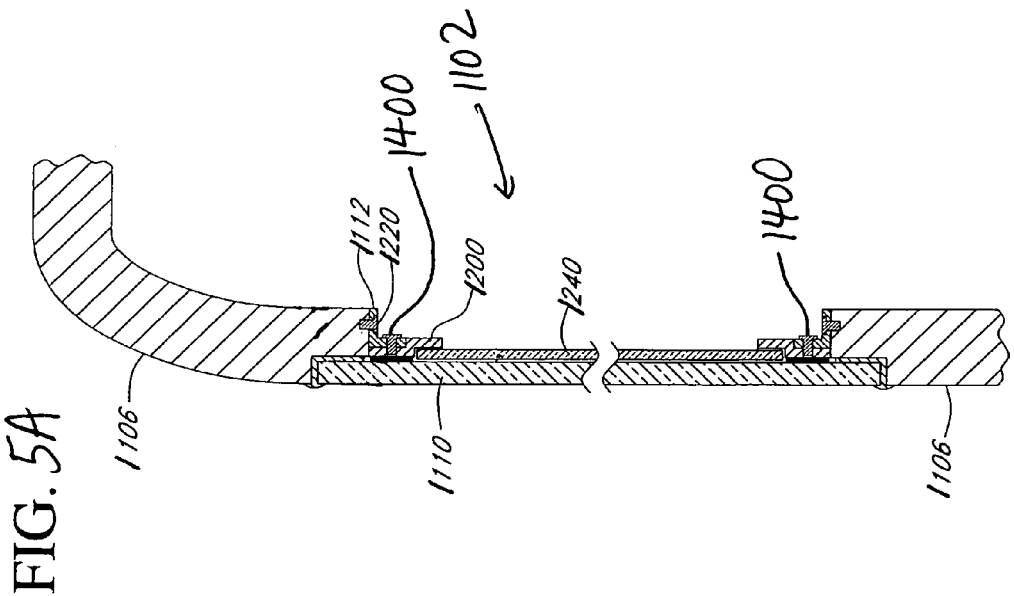

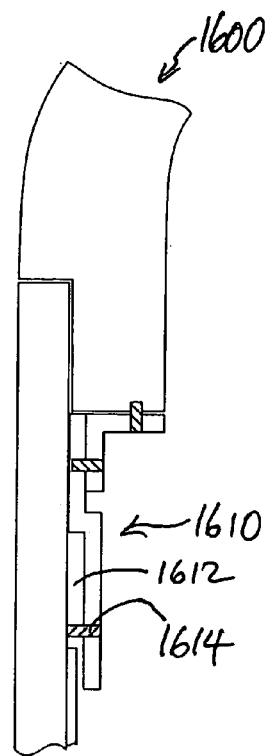
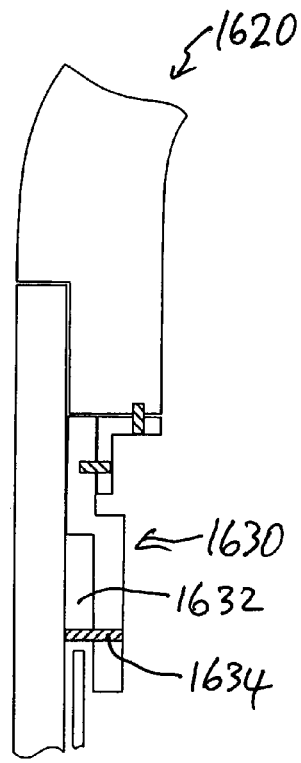
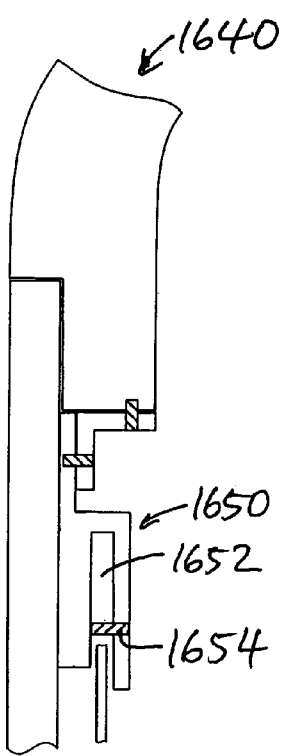
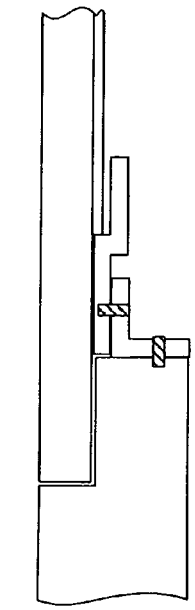
FIG. 8A     FIG. 8B     FIG. 8C

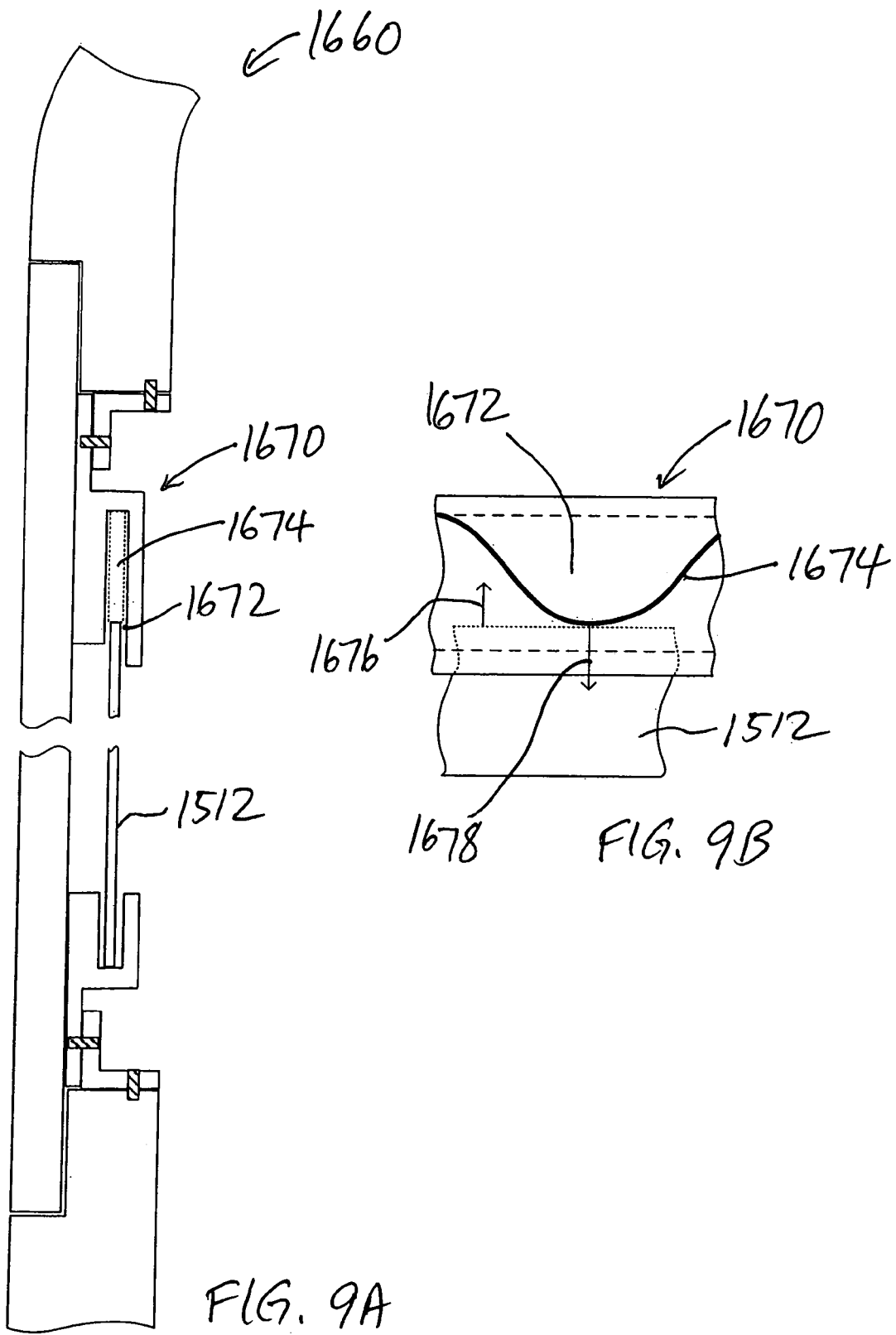

QUICK CHANGE WINDOW ASSEMBLY

CLAIM OF PRIORITY

This application is a continuation-in-part of U.S. patent application Ser. No. 10/684,142 filed Oct. 10, 2003 now U.S. Pat. No. 6,869,128, entitled "Quick Change Window Assembly," which is hereby incorporated by reference herein; this application claims priority to U.S. Provisional Patent Application No. 60/418,385, entitled "Quick Change Window Assembly" filed Oct. 11, 2002, which is hereby incorporated by reference herein.

BACKGROUND OF THE INVENTION

1. Field of the Invention

The present invention relates to window assemblies, and, in particular, concerns a replaceable glazing for window assemblies in public transportation vehicles.

2. Description of the Related Art

In recent years, ground based motor vehicles with aerodynamic exteriors have become popular due, at least in part, to a desirable appearance. In addition to aerodynamic exteriors, flush fitting window assemblies have also contributed to an improved aerodynamic appearance of vehicles including public transportation vehicles, such as buses.

Typically, the glazing of flush fitting window assemblies is recessed within the sidewall of a vehicle so as to form an aerodynamic exterior surface. In most cases, conventional glazing is attached to a recessed periphery around the window opening using an adhesive material, such as glue, epoxy, or putty. The adhesive must be of sufficient strength such that the glazing remains secured in place during use of the vehicle.

In some circumstances, the glazing may need to be replaced due to vandalism, such as breakage, chipping, scratches, and fractures, and also for maintenance needs, such as seal replacement. Consequently, replacing conventional glazing often requires removal of the adhesive used to secure the glazing to the window opening.

In general, removing a high strength adhesive from a flush fitting window assembly is time consuming and labor intensive, wherein conventional glazing removal procedures may require more than one person to work a generally known glazing removal tool. For example, the glazing removal tool is forced through the adhesive between the glazing and the framing supports in the sidewall of the vehicle. Usually, one worker is outside the vehicle and another worker is inside the vehicle on either side of the glazing. The glazing removal tool is moved back and forth by the workers in a cutting motion and guided around the entire periphery of the glazing so as to break the mounting seal of the adhesive. This cutting procedure is time consuming because it has to be performed slowly so as to not damage the window opening.

Once the seal of the adhesive is peripherally broken and the glazing is detached from the window opening, the remaining adhesive on the window opening needs to be removed. Unfortunately, removing the adhesive may cause permanent damage to the framing supports of the window opening. Scrapping the adhesive with a scrapping tool may cause adverse wear on the framing support surfaces, which may result in the framing supports of the window assemblies not properly sealing with reattached glazing. Also, this procedure may cause chipping or flaking of the paint around the window opening resulting in an undesirable appearance. Moreover, the adhesive may need to be scrapped off using undesirable chemical distillates that may evaporate into unhealthy fumes in the work area.

Once the old adhesive is removed, adhesive is reapplied to the window framing and allowed to cure for a lengthy amount of time for proper adherence of the glazing to the window framing. Unfortunately, the curing procedure incurs additional processing time for glazing replacement. In some cases, pressure needs to be applied around the perimeter of the glazing during curing. Otherwise, the glazing may not seal correctly to the window framing. If too much pressure is applied during curing, then the glazing may fracture, or the frame may deform. If too little pressure is applied during curing, then air gaps may form between the glazing and the window framing resulting in a degraded seal. As a result, the process of gauging the pressure and monitoring the pressure distribution on the glazing surfaces even further increases the amount of processing time for glazing replacement.

Therefore, due to the time consuming procedures, conventional glazing and adhesive removal processes require an exorbitant amount of down time for the vehicle. In the case of public transportation vehicles, the vehicles cannot be used in their designed capacity during the above described conventional window replacement processes resulting in loss revenue for the vehicle owner. Also, the manner in which conventional glazing replacement processes are conducted may result in permanent damage to the window openings.

From the foregoing, it will be appreciated that there is a need for an improved window assembly that is easily removable and replaceable while still maintaining the aerodynamic appearance of flush fitting window assemblies for vehicles. To this end, there also exists a need for a window mounting assembly that allows for multiple detachments and reattachments of the glazing from the window assembly with less difficulty such that glazing replacement is less labor intensive and time consuming.

SUMMARY OF THE INVENTION

The aforementioned needs may be satisfied by a window assembly for a vehicle having a window opening formed in a sidewall. In one embodiment, the window assembly comprises at least one frame mounting member that is adapted to be attached to at least a portion of the sidewall so as to be positioned within the window opening, wherein the at least one frame mounting member defines at least one first coupling component. In addition, the window assembly further comprises a piece of glazing having a substantially planar inner surface and a substantially planar outer surface, wherein the piece of glazing is sized so as to be positioned in a first orientation within the window opening formed in the sidewall of the vehicle. Moreover, the window assembly further comprises at least one glazing mounting member adapted to be adhered to the inner surface of the piece of glazing, wherein the at least one glazing mounting member includes at least one second coupling component that engages with the at least one first coupling component on the at least one frame mounting member when the piece of glazing is positioned in the first orientation in the window opening so as to secure the piece of glazing in the first orientation, and wherein the at least one frame mounting member and the at least one glazing mounting member can be detachably engaged from each other so as to permit removal of the piece of glazing and permit replacement of the piece of glazing with a second piece of glazing by reattachment of an at least one glazing mounting member to the inner surface of the second piece of glazing and re-engagement of the first and second coupling members.

In one aspect, the at least one frame mounting member comprises a member that has a first surface which is attached to a portion of the sidewall and a second surface that extends into the window opening defined in the sidewall. The at least one first coupling component comprises a plurality of holes formed in the second surface of the at least one frame mounting member. The at least one second coupling component comprises a plurality of protrusions, and wherein the at least one glazing mounting member is adhered to the inner surface of the piece of glazing at a location selected so that the plurality of protrusions extend through the plurality of holes in the at least one first coupling component so as to be detachably secured thereto. In addition, the window assembly further comprises a plurality of fasteners that attach to the plurality of protrusions so as to secure the protrusions in the openings defined by the at least one frame mounting member.

In another aspect, the at least one glazing mounting member comprises a plurality of glazing mounting members positioned adjacent the outer periphery of the piece of glazing, and wherein each of the at least one glazing mounting members defines a first section that is adhered flush to the inner surface of the glazing and a second section that is spaced away from the inner surface of the glazing so as to define at least one recess when the first section is adhered flush to the inner surface of the glazing. In addition, the window assembly further comprises a sacrificial layer that is positioned within the at least one recess so as to be interposed between the inner surface of the piece of glazing and the interior of the vehicle so as to inhibit damage to the inner surface of the piece of glazing. Moreover, the window assembly further comprises a locking mechanism attached to the second section of the at least one glazing mounting member, wherein the locking mechanism secures the sacrificial layer in the recess between the inner surface of the piece of glazing and the at least one glazing mounting member.

In still another aspect, the sidewall comprises a window mounting recess positioned adjacent to the periphery of the window opening, and wherein the window mounting recess is adapted to receive at least a portion of the piece of glazing such that, when the piece of glazing is positioned within the window opening, the outer surface of the piece of glazing is flush fitting with the outer surface of the sidewall. In addition, the assembly further comprises a sealing gasket that is positioned between the piece of glazing and the window mounting recess. Moreover, the at least one glazing mounting member is adhered to the inner surface of the piece of glazing using at least one material selected from the group consisting of glue, epoxy, and putty.

The aforementioned needs may also be satisfied by a window assembly for a vehicle having a window opening with a recessed periphery formed in a sidewall of the vehicle. In one embodiment, the assembly comprises at least one frame member having a first leg member mounted within the window opening of the vehicle, the at least one frame member having a second leg member with a plurality of apertures formed there through. In addition, the assembly comprises a piece of glazing having an inner surface that is positioned, at least in part, adjacent the recessed periphery of the window opening such that an outer surface of the glazing substantially aligns with the outer surface of the sidewall. Moreover, the assembly comprises at least one retainer having a mounting surface attached to at least a portion of the inner surface of the piece of glazing and a plurality of protrusions that extend through the plurality of apertures when the piece of glazing is positioned adjacent to the recessed periphery and are detachably engaged to a plurality of fasteners so as to secure the at least one retainer to the at least one frame member thereby securing the piece of glazing to the window opening in a manner such that the piece of glazing can be removed by disengaging the fasteners from the protrusions and reattached by re-engaging the fasteners to the protrusions when the protrusions are re-extended through the plurality of apertures.

In one aspect, the retainer further comprises an extending member that distally extends from the mounting surface of the retainer so as to define a slotted region between the member and around at least a portion of the perimeter of the piece of glazing. In addition, the window assembly further comprises a protective panel that is positioned adjacent the inner surface of the piece of glazing and secured by the slotted region defined by the extending member of the retainer. Also, the retainer further comprises at least one locking member that is attached to the extending member and, when actuated, the locking member further secures the protective panel in the slotted region.

In another aspect, the at least one retainer comprises a plurality of retainers adhesively attached to the outer periphery of the piece of glazing, wherein each of the retainers comprises at least one protrusion. In addition, the at least one frame member comprises a plurality of frame members, wherein each of the frame members comprise a first leg member mounted within the window opening of the vehicle and a second leg member having at least one aperture that is positioned to interconnect with the at least one protrusion of the retainer when the protrusion is extended through the at least one aperture. Moreover, the assembly further comprises a sealing gasket that is positioned between the piece of glazing and the recessed periphery of the window opening.

The aforementioned needs may also be satisfied by a window assembly for a vehicle having a sidewall with a window opening formed therein. In one embodiment, the window assembly comprises a framing member attached to the sidewall so as to be positioned within the window opening, wherein the framing member defines a first coupling component and a first glazing member sized so as to be positioned in the window opening adjacent to the framing member. In addition, the window assembly further comprises a mounting member attached to the first glazing member, wherein the mounting member defines a second coupling component that is adapted to engage with the first coupling component when the first glazing member is positioned in the window opening adjacent to the framing member, and wherein the framing member and the mounting member can be detachably engaged from each other so as to permit removal of the first glazing member from the window opening.

In one aspect, the framing member and the mounting member can be detachably engaged from each other so as to further permit replacement of the first glazing member with a second glazing member by reattachment of mounting member to the second glazing member and re-engagement of the first and second coupling members. In addition, the framing member comprises a plurality of framing members that are arranged so as to be positioned within the window opening and attached to the sidewall. Also, the framing member defines a plurality of first coupling components, and wherein the mounting member defines a plurality of second coupling components that are adapted to engage the plurality of first coupling components. Moreover, the mounting member comprises a plurality of mounting members that are attached to the first glazing member.

In another aspect, the first coupling component comprises one or more apertures formed in the framing member. In addition, the second coupling component comprises one or more protrusions that are adapted to extend from the mounting member through the one or more apertures formed in the framing member. Also, the window assembly further comprises one or more fasteners that are adapted to mount to the one or more protrusions so as to secure the one or more protrusions of the mounting member to the one or more apertures of the framing member.

In still another aspect, the mounting member comprises one or more mounting members positioned adjacent the outer periphery of the glazing member, and wherein each of the mounting members defines a first section that is adhered flush to the glazing member and a second section that is spaced away from the glazing member so as to define at least one recess when the first section is adhered flush to the inner surface of the glazing. In addition, the window assembly further comprises a sacrificial layer that is positioned within the at least one recess so as to be interposed between the glazing member and the interior of the vehicle so as to inhibit damage to the glazing member. Also, the window assembly further comprises a locking mechanism attached to the second section of the mounting member, wherein the locking mechanism secures the sacrificial layer in the at least one recess between the glazing member and the mounting member. Moreover, the sidewall comprises a mounting recess positioned adjacent to the periphery of the window opening, and wherein the mounting recess is adapted to receive at least a portion of the glazing member such that, when the glazing member is positioned in the window opening, the outer portion of the glazing member is flush fitting with the outer portion of the sidewall. Also, the assembly further comprises a sealing gasket that is positioned between the glazing member and the mounting recess.

The aforementioned needs may also be satisfied by a method of installing glazing into a window opening of a vehicle. In one embodiment, the method comprises attaching at least one frame mounting member to a surface of the vehicle such that a portion extends into the plane of the window opening and attaching at least one glazing mounting member to a piece of glazing sized to be positioned within the window opening. In addition, the method comprises positioning the piece of glazing in the window opening such that the at least one frame mounting member and the at least one glazing mounting member are positioned proximate each other and coupling the frame mounting member and the glazing mounting member to each other so as to secure the piece of glazing in the window opening.

In one aspect, attaching the at least one frame mounting member comprises mounting a plurality of frame mounting members about 4 sides of the window opening. In addition, attaching the frame mounting members comprises mounting an L-shaped member with an opening on one leg to the sidewall of the vehicle immediately adjacent the window opening such that the leg containing the opening is positioned within the plane of the window. Also, attaching at least one glazing mounting member comprises adhering a plurality of glazing mounting members each having a protrusion to the piece of glazing at locations such that the protrusions extend through the openings in the plurality of frame mounting members.

In another aspect, coupling the frame mounting member to the glazing mounting member comprises attaching a fastener to the protrusions so as to inhibit removal of the protrusions from the openings. In addition, positioning the piece of glazing in the window opening comprises positioning the piece of glazing within a window mounting recess formed adjacent to the periphery of the window opening such that, when the piece of glazing is positioned within the window mounting recess, the outer surface of the piece of glazing is flush fitting with the outer surface of the sidewall. Also, positioning the piece of glazing in the window opening comprises positioning a sealing gasket between the piece of glazing and the window opening.

In still another aspect, attaching at least one glazing mounting member to a piece of glazing comprises positioning the glazing mounting member adjacent the outer periphery of the piece of glazing, and wherein the at least one glazing mounting member defines a first section that is adhered flush to the piece of glazing and a second section that is spaced away from the piece of glazing so as to define at least one recess when the first section is adhered flush to the inner surface of the piece of glazing. In addition, the method further comprises positioning a sacrificial layer within the at least one recess so as to be interposed between the piece of glazing and the interior of the vehicle so as to inhibit damage to the piece of glazing. Also, the method further comprises securing the sacrificial layer to the second section of the glazing mounting member with a locking mechanism, and wherein the locking mechanism secures the sacrificial layer in the at least one recess between the piece of glazing and the glazing mounting member.

One aspect of the present teachings relates to a window assembly for a vehicle having a window opening formed in a wall that has an outer surface. The assembly includes a glazing having an inner surface and an outer surface. The glazing is sized to fit within the window opening such that the outer surface of the glazing is substantially flush with the outer surface of the wall. The glazing has a first edge and a second edge that is generally opposite from the first edge. The assembly further includes a wall mounting member that includes a first section that is proximate the first edge of the glazing, and a second section that is proximate the second edge of the glazing. The wall mounting member is attached to the wall. The assembly further includes a glazing mounting member that includes a first section and a second section. The glazing mounting member is attached to the inner surface of the glazing. The first and second sections of the glazing mounting member removably mount respectively to the first and second sections of the wall mounting member thereby allowing the glazing to be removably mounted to the wall. The first section defines a first space having a first depth, and the second section defines a second space having a second depth, with the first and second depths being along a direction having a component that is substantially parallel to the inner surface of the glazing. The assembly further includes a sacrificial protective panel having a first edge and a second edge that is generally opposite from the first edge. The sacrificial protective panel is sized such that the first and second edges of the sacrificial protective panel are respectively retained in the first and second spaces such that the sacrificial protective panel is positioned inward of the inner surface of the glazing. The first and second depths are selected such that when the sacrificial protective panel is retained therein, the first edge of the sacrificial protective panel is able to move deeper into the first space by an amount sufficient to allow the second edge of the sacrificial protective panel to be removed from the second space.

In one embodiment, the first edge of the glazing comprises an upper edge of the glazing, and the second edge of the glazing comprises a lower edge of the glazing.

In one embodiment, the first section of the glazing mounting member comprises a first leg that extends substantially parallel to the glazing and attaches to the inner surface of the glazing. The first leg extends substantially parallel to the glazing and attaches to the inner surface of the glazing. The first section of the glazing mounting member further comprises a second leg that is offset inward from the first leg and extends substantially parallel to the glazing such that the second leg defines the first space having the first depth between the second leg and the inner surface of the glazing.

In one embodiment, the second section of the glazing mounting member comprises a first leg that extends substantially parallel to the glazing and attaches to the inner surface of the glazing. The first leg extends substantially parallel to the glazing and attaches to the inner surface of the glazing. The second section of the glazing mounting member further comprises a second leg that is offset inward from the first leg and extends substantially parallel to the glazing such that the second leg defines the second space having the second depth between the second leg and the inner surface of the glazing.

In one embodiment, the first depth is greater than the second depth, thereby allowing the first edge of the sacrificial protective panel to move deeper into the first space to allow removal of the second edge of the sacrificial protective panel from the second space. In one embodiment, the first and second spaces are bounded by the inner surface of the glazing and the respective second legs of the first and second sections of the glazing mounting member. In one embodiment, each of the first and second sections of the glazing mounting member comprises a third leg that extends substantially parallel to the glazing and interposed between the respective second leg and the inner surface of the glazing.

In one embodiment, the sacrificial protective panel is in contact with the inner surface of the glazing. In one embodiment, the sacrificial protective panel is not in contact with the inner surface of the glazing.

These and other aspects, advantages, and novel features of the invention will become apparent upon reading the following detailed description and upon reference to the accompanying drawings. In the drawings, similar elements have similar reference numerals.

BRIEF DESCRIPTION OF THE DRAWINGS

FIGS. 3C and 3D illustrate cross-sectional views of some of the possible variations to the window assembly of FIG. 2A wherein one or more retainers with the locking members are used to secure the sacrificial protective panel adjacent to the glazing.

FIG. 5A illustrates a cross sectional view of one embodiment of a window assembly with a glazing in the installed configuration, wherein a glazing mounting member is mounted to the inner surface of the glazing and detachably connected to the wall mounting member by one or more removable fasteners.

FIG. 5B illustrates a cross sectional view of one embodiment of the window assembly of FIG. 5A in a partially unassembled configuration, wherein the glazing mounting member remains mounted to the glazing as illustrated in FIG. 5A and disconnected from the wall mounting member by disengaging the fasteners.

FIGS. 8A–8C illustrate cross-sectional views of various example embodiments of the window assembly having similar example glazing mounting members of FIGS. 7A–7C, and locking members that inhibit movement of the sacrificial protective panel.

FIGS. 9A and 9B show one embodiment of the window assembly having a movement resisting member that resists movement of the sacrificial protective panel.

DETAILED DESCRIPTION OF THE PREFERRED EMBODIMENT

Figure 1:
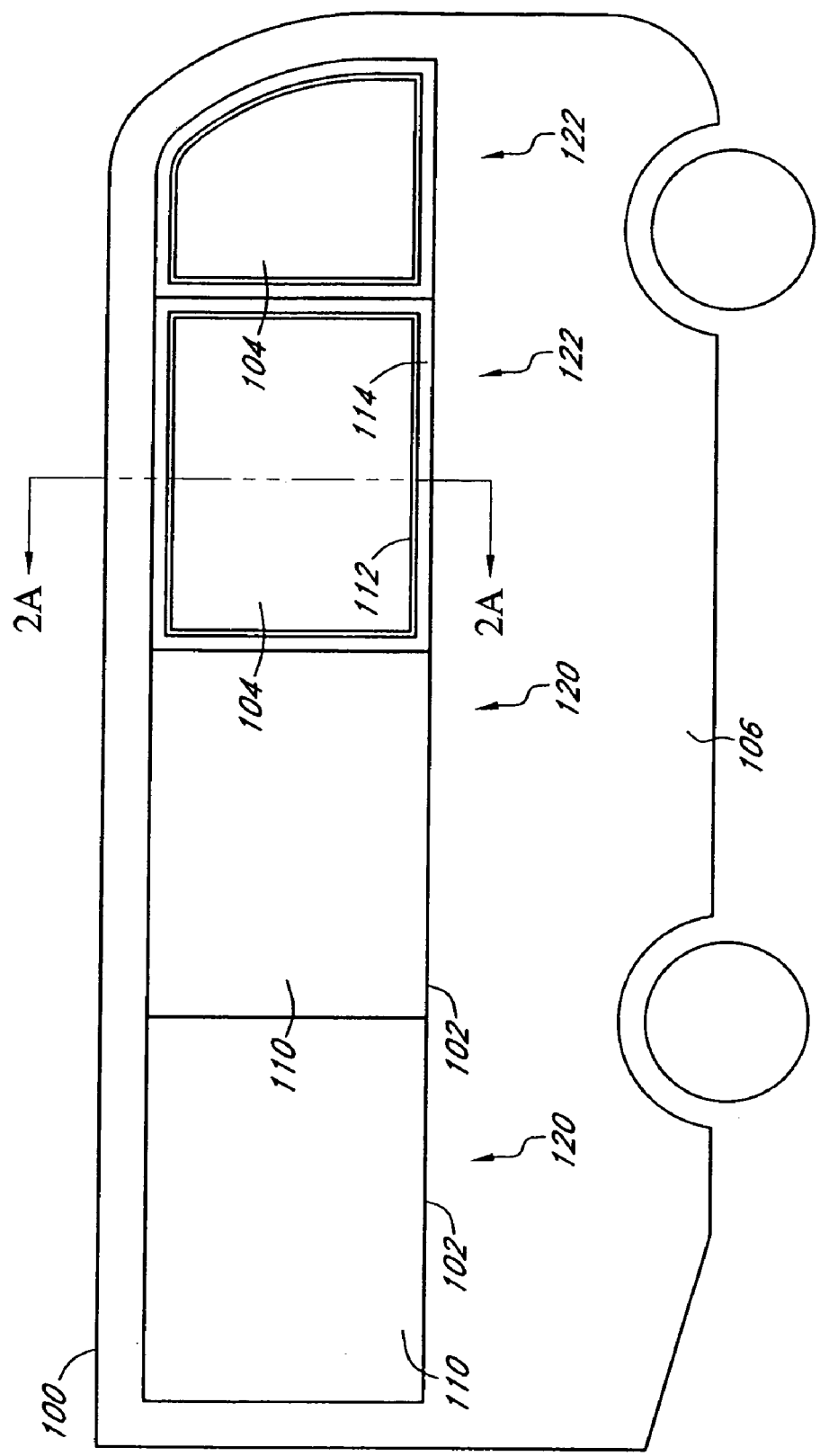
FIG. 1 illustrates one embodiment of a public transportation vehicle having windows mounted within openings in a sidewall of the vehicle.

Reference will now be made to the drawings wherein like numerals refer to like parts throughout. FIG. 1 illustrates one embodiment of a public transportation vehicle 100 having window assemblies 102 mounted within window openings 104 in a sidewall 106 of the vehicle 100. As will be described in greater detail herein below, each window assembly 102 may comprise at least one piece of glazing 110 that may be detachably engaged with at least one frame mounting member 112 so as to permit attachment, detachment, and reattachment in a rapid manner. As illustrated in FIG. 1, the piece of glazing 110 is shown in an attached or reattached configuration 120 and a detached configuration 122.

In one embodiment, the piece of glazing 110 may comprise a substantially planar inner surface and a substantially planar outer surface. The piece of glazing 110 may be sized so as to be positioned in a first orientation within the window opening 104 formed in the sidewall 106 of the vehicle 100. The first orientation may comprise a recessed orientation, wherein a recessed periphery 114 around the perimeter of the window opening 104 is used to position the glazing 110, at least in part, within the window opening 104. In one aspect, the recessed periphery 114 of the window opening 104 may be integrally formed as part of the sidewall 106, and the frame mounting member 112 may be attached to at least a portion of the sidewall 106 so as to also be positioned, at least in part, within the window opening 104.

It should be appreciated that, even though the following discussion is described in connection with a bus, the window mounting assembly as described herein may be used in various applications including other types of public transportation vehicles, such as trains and boats, and fixed window environments, such as buildings and industrial structures. As will also be apparent from the following discussion, the window mounting assembly of the present invention facilitates rapid installation, removal, and replacement of glazing.

Figure 2A:
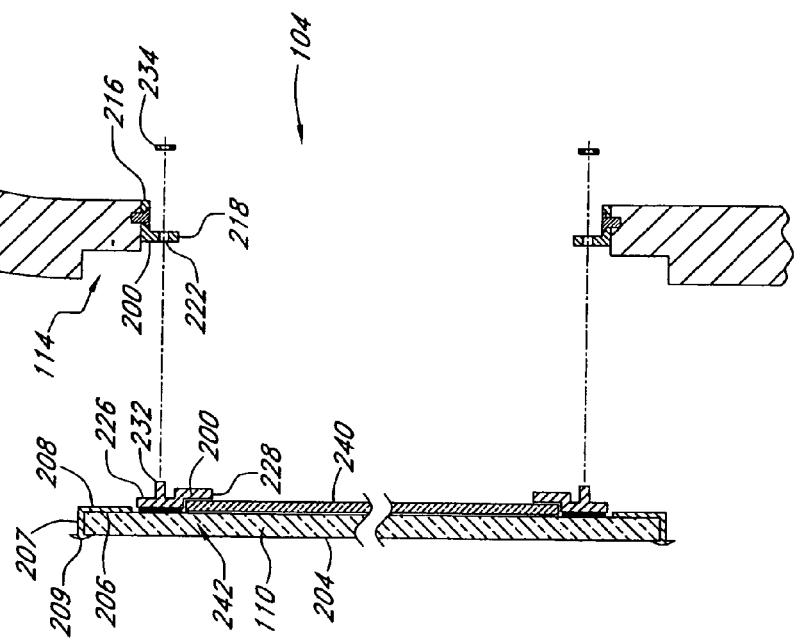
FIG. 2A illustrates a cross sectional view of one embodiment of a window assembly with a glazing in the installed configuration, wherein a retainer is mounted to the glazing using an adhesive and detachably connected to the frame member using a bolting mechanism.
Figure 2B:
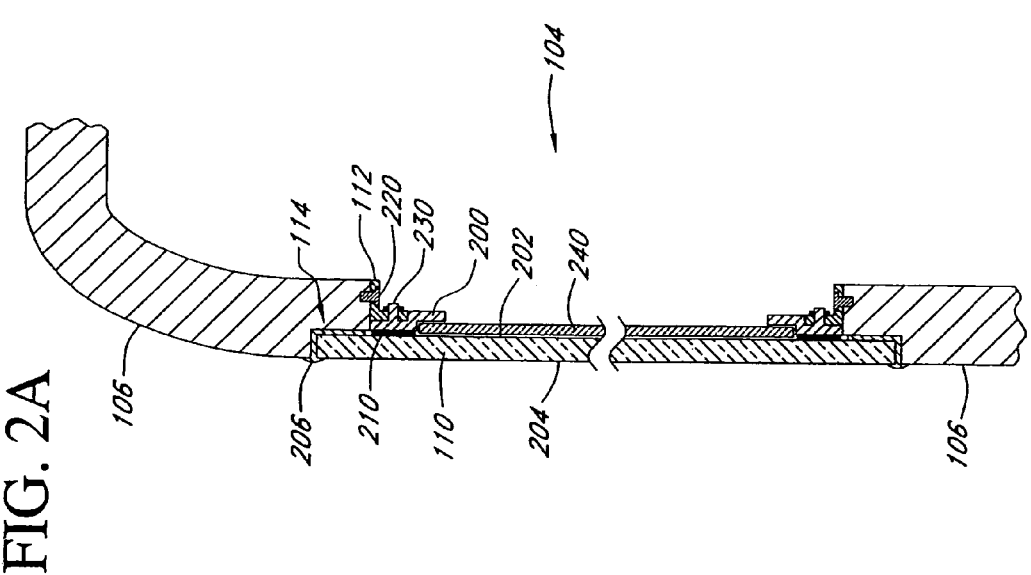
FIG. 2B illustrates a cross sectional view of one embodiment of the window assembly of FIG. 2A in a partially unassembled configuration, wherein the retainer remains mounted to the glazing as illustrated in FIG. 2A and disconnected from the frame member by disengaging the bolting mechanism.

FIG. 2A illustrates a cross sectional view of one embodiment of the glazing 110 in the attached or reattached configuration 120. FIG. 2B illustrates a cross sectional view of one embodiment of the glazing 110 in the detached configuration 122. In particular, FIGS. 2A, 2B illustrate the manner in which the glazing 110 is positioned and secured within the window opening 104 and then easily detached for rapid removal and replacement.

As illustrated in FIG. 2A, the glazing 110 is positioned adjacent the recessed periphery 114 so as to be positioned, at least in part, within the window opening 104. An outer surface of the 204 of the glazing 110 substantially aligns with the outer surface of the sidewall 106 forming, in one embodiment, a flush fitting window assembly. It should be appreciated that the window opening 104 may not comprise a recessed periphery 114 and that the glazing 110 may be positioned adjacent to the exterior surface of the sidewall 106 such that the glazing 110 is not positioned within the window opening 104 without departing from the scope of the present invention.

A sealing component 206, such as a rubber gasket, may be positioned between the glazing 110 and the recessed periphery 114 so as to form a seal and insulate the interior of the vehicle 100 from the exterior environment outside the vehicle 100. As illustrated in FIG. 2B, the sealing component 206 may comprise a first and second gasket member 207, 208 that are attached at distal ends so as to form an L-shaped gasket structure. At the distal end of the first gasket member 207, the midpoint of a barrier section 209 is attached to form an exterior seal extending from the exterior surface of the sidewall 106 to the outer surface 204 of the glazing 110. In one aspect, the barrier section 209 may comprise a semi-curricular shape having a flat lower base attached to the first member 207 of the sealing component 206. In another aspect, the barrier section 209 may comprise a flat rectangular shape having an underside attached to the first member 207 of the sealing component 206.

In addition, it should be appreciated that the sealing component 206 may also function as a cushioning device that reduces the impact of vibrations caused during motion of the vehicle 100. It should also be appreciated that the sealing component 206 may be attached to either the glazing 110 or the recessed periphery 114 using an adhesive, such as glue, prior to positioning the glazing 110 adjacent the recessed periphery 114 without departing from the scope of the present invention.

The frame mounting member 112 is shown attached to the sidewall 106 within the window opening 104 using a first fastener 220, such as a screw, in a generally known manner. The frame mounting member 112 may be formed of a resilient material, such as aluminum, plastic, or various composite materials and may be adapted to fit the size and shape of various window openings in most vehicles. In one embodiment, the frame mounting member 112 is an L-shaped structure having a first and second leg member 216, 218 attached at distal ends, wherein the first leg 216 of the frame mounting member 112 may be mounted to an interior surface of the window opening 104. In addition, the second leg 218 of the frame mounting member 112 extends from the first leg 216 into the window opening 104 and is adapted with at least one first coupling component 222, such as an aperture or hole (shown in FIG. 2B), to receive at least one second coupling component 230 of the retainer 200 in a manner as described herein below. Moreover, the first coupling component 222 may comprise a plurality of apertures or holes formed in the frame mounting member 112 without departing from the scope of the present invention.

In one aspect, the frame mounting member 112 may also be elongated to fit the length or height of the window opening 104 or contoured to fit the shape of the window opening 104. It should be appreciated that the at least one first coupling component 222 may be adapted to receive an interlocking ridge, hook, or the like for the purpose of securing the retainer 200 to the frame mounting member 112 without departing from the scope of the present invention. Additionally, it should be appreciated that an adhesive, such as glue may be used in conjunction with the at least one first fastener 220 or screw to attach the frame mounting member 112 to the sidewall 106 without departing from the scope of the present invention. It should also be appreciated that a plurality of frame mounting members 112 may be attached to one or more of the upper, lower, and side interior surfaces of the window opening 104 without departing from the scope of the present invention.

In one embodiment, a glazing mounting member or retainer 200 is mounted to at least a portion of the inner surface 202 of the glazing 110 using an adhesive 210, such as a silicon or epoxy resin adhesive, and detachably engaged to the frame mounting member 112 using at least one second coupling component 230. As with the frame mounting member 112, the retainer 200 may be formed of a resilient material, such as aluminum, plastic, or various composite materials and may be adapted to fit the size and shape of various window openings in most vehicles. The retainer 200 may also be elongated to fit the length or height of the glazing 110 or contoured to fit the shape of the glazing 110. As illustrated in FIG. 2B, the retainer 200 may comprise a base member 226 having a first and second mounting surface 227a, 227b. Moreover, the upper portion of the inner surface 202 of the glazing 110 is shown mounted to the first mounting surface 227a of the base member 226.

The second coupling component 230 may comprise at least one protrusion or bolt member 232 that perpendicularly extends from the second mounting surface 227b of the base member 226 and engages the first coupling component 222 (shown in FIG. 2B) of the frame mounting member 112. The second coupling component 230 may be integrally formed as part of the base member 226, or the second coupling component 230 may be attached to the base member 226 via welding, etc. without departing from the scope of the present invention. The second coupling component 230 of the retainer 200 is secured to the first coupling component 222 of the frame mounting member 112 by a second fastener 234, such as a nut. In one embodiment, the protrusion or bolt member 232 is threaded so as to receive the second fastener or nut 234. In another embodiment, the retainer 200 comprises a plurality of protrusions 232 that engage the frame mounting member 112 via a plurality of holes 222 and are detachably secured to the frame mounting member 112 with a plurality of nuts 234. It should be appreciated by one skilled in the art that various other coupling arrangements, such as interlocking ridges, hooks, or the like, may be used to ensure positive retention of the retainer 200 to the frame mounting member 112.

The second fastener 234 rigidly secures the glazing 110 in the first orientation or recessed periphery 114 within the window opening 104 of the sidewall 106. Advantageously, the second fastener 234 may be removed to allow removal of the glazing 110 and then re-engaged to allow replacement or reattachment of the glazing 110 to the frame mounting member 112 in a timely manner. In the prior art, the adhesive has to be cut away from the glazing and removed from the window opening prior to glazing replacement, wherein the conventional glazing replacement procedure is labor intensive and time consuming in a manner as previously described. Conversely, less time is needed to remove and replace glazing in a vehicle comprising the window assembly of the present invention due to the ease and speed at which the fasteners 234 may be removed and replaced. As a result, the present invention offers rapid glazing replacement for window assemblies in most vehicles, such as public transportation vehicles. In addition, existing vehicles may be retrofitted with the frame mounting members so as to improve the temporal efficiency of glazing replacement, wherein the frame mounting members and the glazing may be adapted to fit most vehicles.

The retainer 200 may further comprise a flanged member 228 that extends in a parallel manner from the base member 226. The flanged member 228 is distally spaced from base member 226 such that the flanged member 228 defines a slotted region or space 242 that is capable of receiving a sacrificial protective panel 240. Desirably, the sacrificial protective panel 240 slides between the glazing 110 and the retainer 200 in the slotted region 242 and serves to protect the surfaces of the glazing 110 from vandalism. Additional protective scope and functionality of the sacrificial protective panel 240 is described in greater detail in the Applicant's issued U.S. Pat. No. 6,206,453 entitled, "Window Protector Assembly," which is hereby incorporated by reference in its entirety.

In one embodiment, the protective panel 240 is formed of a substantially flexible and resilient material that is easily flexed at its edges into position between the glazing 110 and the one or more retainers 200. When the protective panel 240 is released, it resumes its unflexed shape adjacent to the glazing 110 and the edges are secured by the flanged member 228 of the retainer 200. Such an arrangement allows for easy removal from the protective panel 240 using generally known tools, such as a suction gripping device. Additional scope and functionality relating to the protective panel 240 is described in greater detail in the Applicant's issued U.S. Pat. No. 6,408,574 entitled, "Quick Release Sacrificial Shield and Window Assembly," which is hereby incorporated by reference in its entirety.

Figure 3A:
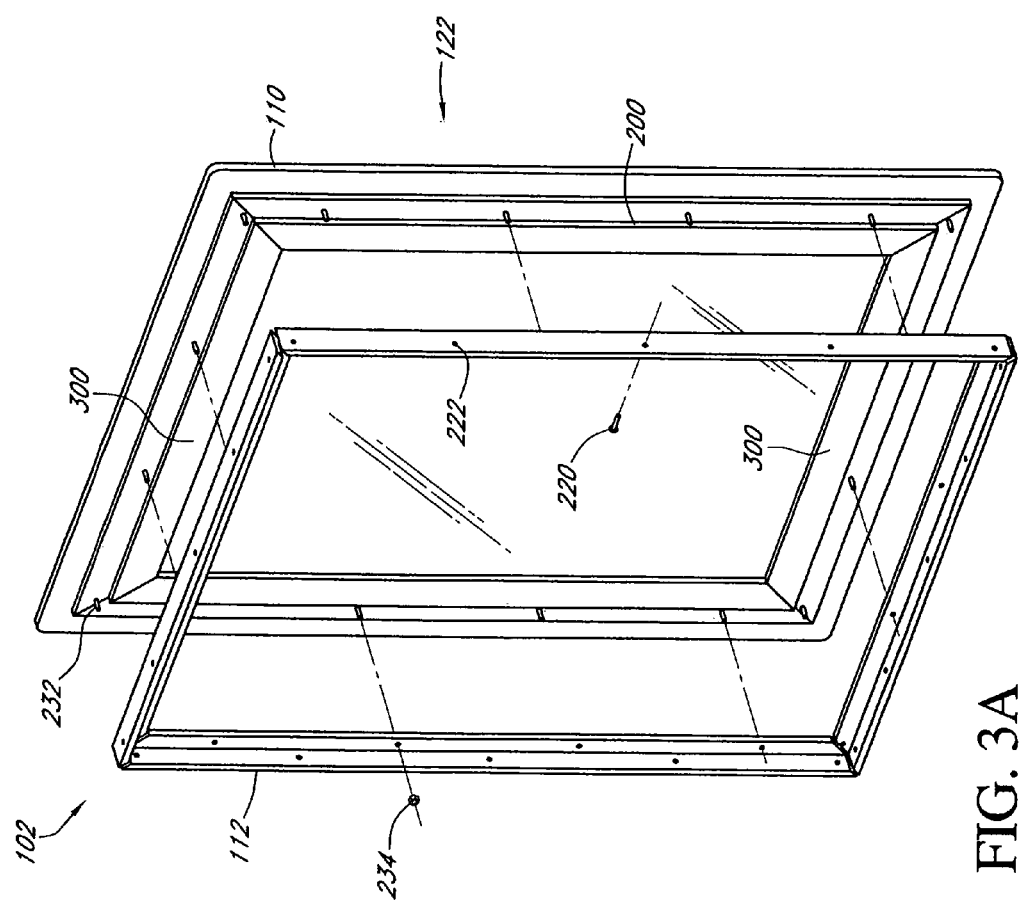
FIG. 3A illustrates a perspective view of one embodiment of a frame mounting member that facilitates mounting of the window assembly of FIGS. 2A and 2B, wherein a locking member is used to secure a sacrificial protective layer adjacent to the glazing.

FIG. 3A illustrates a perspective view of one embodiment of the glazing 110 and the frame mounting members 112 of the window assembly 102 in the detached configuration 122. The glazing 110 is shown attached to a plurality of retainers 200 that may be mounted towards the outer edges or periphery of the glazing 110 so as to be substantially parallel with corresponding frame mounting members 112. As shown, the first coupling components 222 of the frame mounting members 112 substantially align with the second coupling components 232 of the retainers 200 and the second fasteners 234.

Figure 3B:
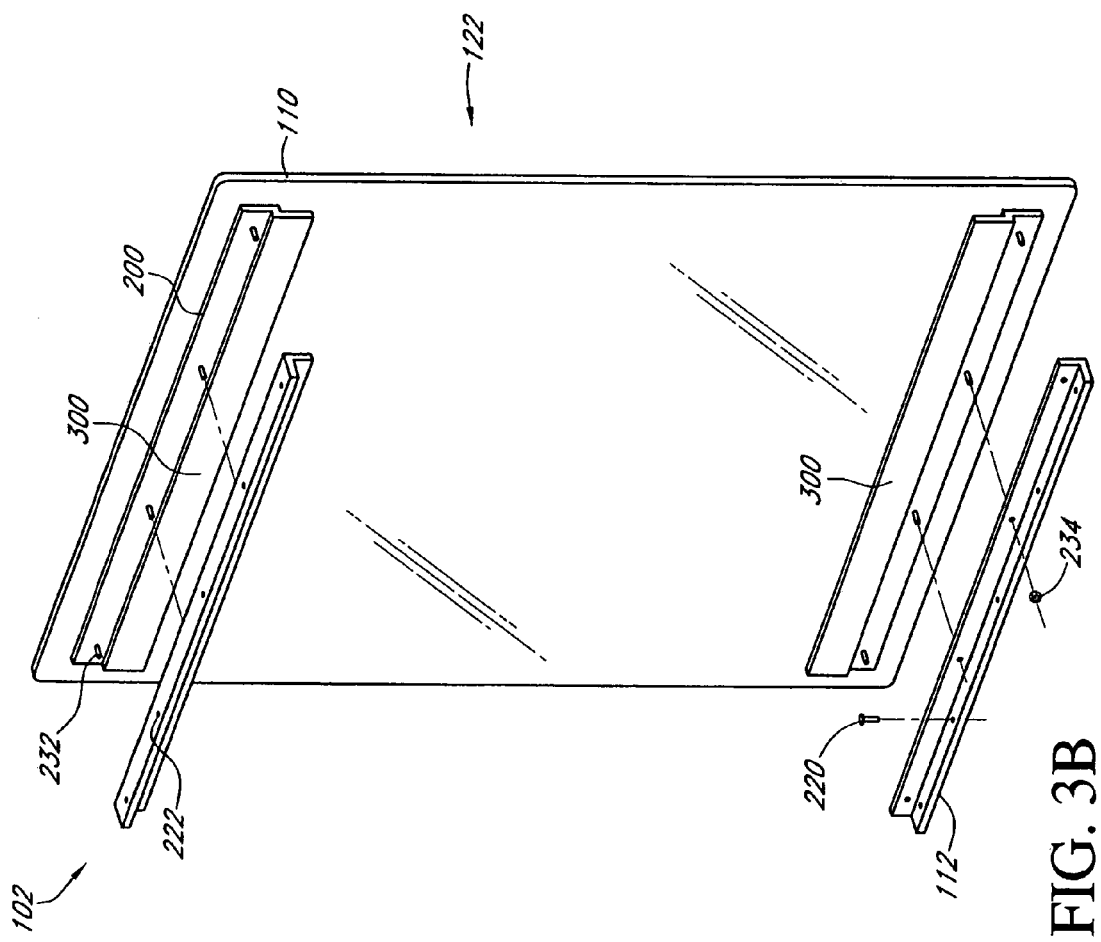
FIG. 3B illustrates a perspective view of another embodiment of the frame mounting member that can facilitate mounting of the window assembly of FIGS. 2A and 2B, wherein the frame mounting member includes at least two frame mounting sections positioned at opposing ends of the window opening so as to receive a plurality of second coupling components of at least two retainers.

In another embodiment, as illustrated in FIG. 3B, at least two retainers 200 may be attached to the glazing 110 at opposing ends so as to support at least one sacrificial protective panel 240. Similarly, the frame mounting member 112 may comprise one or more component pieces without departing from the scope of the present invention. In yet another embodiment, as illustrated in FIG. 3B, at least two frame mounting members 112 may be positioned at opposing ends of the window opening 104 so as to receive one or more second coupling components 230 of the one or more retainers 200.

It should be appreciated that the orientation of the at least two retainers 200 and frame mounting members 212 may be positioned on right and left side portions or the upper and lower portions of the window opening 104 or all four sides of the window opening 104 without departing from the scope of the present invention. Such arrangements may improve the ease with which the glazing 110 and the protective panel 240 are removed, replaced, or reattached. Advantageously, one or more of the frame mounting members 112 and retainers 200 may be adapted to fit various sizes and shapes of window openings so as to promote easy installation, removal, and replacement.

FIGS. 3A, 3B further illustrate the addition of one or more locking members 300 to the frame mounting members 214. FIG. 3C illustrates the cross-sectional view of the glazing 110 of FIG. 2A in the attached or reattached configuration 120, wherein the one or more locking members 300 of FIG. 3A are shown securing the sacrificial protective panel 240 to the glazing 110. In one embodiment, as illustrated in FIG. 3C, the one or more locking members 300 may comprise a flat screw that is placed in a hole in the retainer 200 and, when tightened down, secures the sacrificial protective panel 240 adjacent to the inner surface of the glazing 110. As previously described, the protective panel 240 may comprise a flexible material such that, when flexed, the upper and lower edges of the protective panel 240 may be positioned adjacent the inner surface 202 of the glazing 110. Subsequently, when unflexed, the protective panel 240 may slide into an upper and lower slotted region 242, 244 defined by the flanged members 228 of the retainers 200. The locking members 300 secure the protective panel 240 to the glazing 110 when in this particular position.

Alternatively, as illustrated in FIG. 3D, the retainer 200 may comprise an elongated flanged member 228 so as to form an upper slotted region 242 that is at least longer than a lower slotted region 244. In this particular embodiment, the upper edge of the sacrificial protective panel 240 is first placed in the upper slotted region 242 and slid towards the upper portion of the upper slotted region 242. This allows the lower edge of the protective panel 240 to fit into the lower slotted region 244 and slide down towards the lower portion of the lower slotted region 244. When in this position, a gap is formed above the upper edge of protective panel 240 towards the upper portion of the upper slotted region 242. At this point, the locking mechanism 300 can be positioned to block the gap so as to prevent the protective panel 240 from sliding upwards, which further prohibits removal of the protective panel 240 from the retainers 200. In one aspect, the locking members 300 may comprise one or more retaining gaskets that are adapted to secure the sacrificial protective panel 240 in a manner as described in the Applicant's issued U.S. Pat. No. 6,408,574.

From the foregoing description, it should be appreciated that the installation, removal, and replacement of the glazing 110 is easy and rapid. For example, the retainers 200 may be easily attached to the glazing 110 using the adhesive 210, such as epoxy resin. Following, the retainer 200 and glazing 110 assembly may then be detachably engaged to the frame mounting member 112 in an easy manner using fasteners, such as the protrusion member 232 and the nut fastener 234. If the glazing 110 needs to be removed or replaced for some reason, rapid detachment and replacement of the glazing 110 is easily accomplished due to the detachable engagement of the retainer 200 to the frame mounting member 112. For example, the nut 234 can be loosened and removed from the protrusion member 232, then the protrusion member 232 can be disengaged from the apertures or holes 222 in the frame mounting member 112. Subsequently, the glazing 110 and retainer 200 assembly is readily detached from the frame mounting member 112. Then, either a the same or another glazing 110 and retainer 200 assembly may be re-attached or replaced with less difficulty.

Advantageously, the glazing 110, frame mounting members 112, and the retainers 200 may be adapted in size and shape to fit or retrofit most existing vehicles, such as public transportation vehicles. In particular, the frame mounting members 112 may be easily attached to the interior of the window opening 104 using fasteners 220, such as screws. As a result, many currently used public transpiration vehicles, such as buses, could be retrofitted with the quick change window assembly of the present invention. The size and shape of the glazing 110, frame mounting members 112, and the retainers 200 may be adapted to retrofit most window openings in most conventional vehicles. Once older, unmanageable window assemblies are removed, the quick change window assemblies of the present invention may be easily installed into existing window openings of currently used vehicles. Once installed, the advantages of rapid removal and replacement of the quick change window assemblies of the present invention can be realized.

Figure 4:
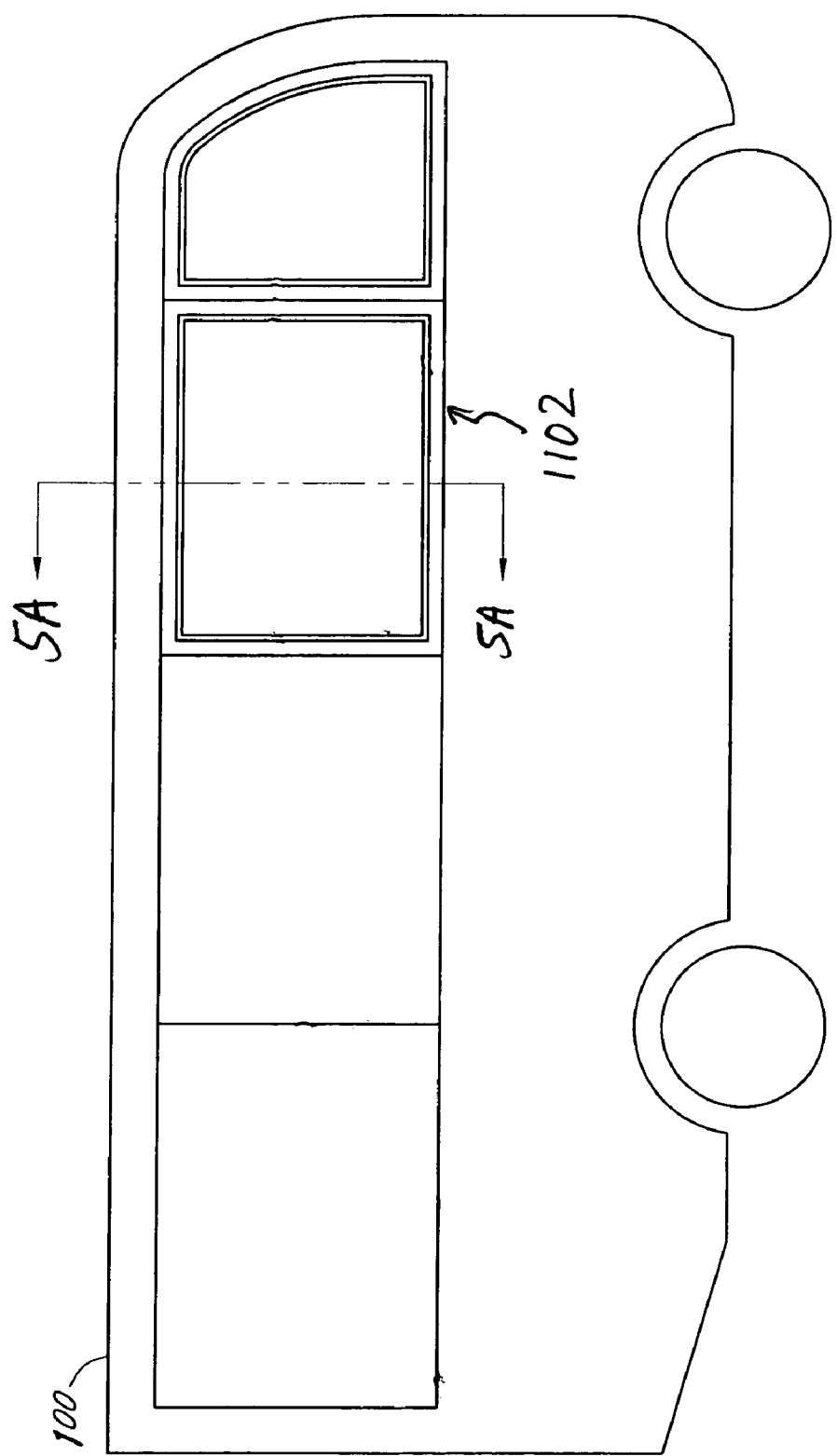
FIG. 4 illustrates another embodiment of the public transportation vehicle of FIG. 1.

FIGS. 4–6 now show other embodiments that are depicted in a manner similar to that of FIGS. 1–3. As shown in FIG. 4, one embodiment of a window assembly 1102 for the example vehicle 100 is shown to have a cross-sectional view that is depicted in greater detail in FIG. 5A.

In one embodiment as shown in FIGS. 5A and 5B, the window assembly 1102 is generally similar to that described above in reference to FIGS. 2A and 2B in that the window assembly 1102 allows a glazing 1110 to be mounted in a substantially flush manner with respect to a wall 1106 of the vehicle. The example window assembly 1102 includes a wall mounting member 1112 that couples a glazing mounting member 1200 to the wall 1106. In one embodiment, the glazing mounting member 1200 is mounted to the glazing 1110, such that the glazing 1110 is flush-mounted to the wall 1106.

In one embodiment as shown in the cross-sectional view of FIGS. 5A and 5B, the glazing mounting member 1200 includes a first leg 1226 that and a second leg 1228 that is offset from the first leg 1226 and extends in a direction having a component that is substantially opposite from the direction of extension of the first leg 1226. The first leg 1226 can be attached to the glazing 1110 in a number of ways. In one embodiment, the first leg 1226 is attached to the inner surface of the glazing by an adhesive.

In one embodiment as shown in the cross-sectional view of FIGS. 5A and 5B, the wall mounting member 1112 includes a first leg 1216 and a second leg 1218 that are joined so as to generally form an "L" shape. The first leg 1216 defines one or more apertures (1222 in FIGS. 6A and 6B) that allow mounting of the first leg 1216 to the wall 1106 in a manner similar to that described above in reference to FIGS. 2–3.

In one embodiment as shown in FIGS. 5–6, the second leg 1218 of the wall mounting member 1112 defines one or more apertures 1450 dimensioned to allow passage of corresponding fasteners 1400. In one embodiment, the first leg 1226 of the glazing mounting member 1200 defines corresponding fastener receiving openings 1452 that are dimensioned to receive and removably retain the corresponding fasteners 1400. Thus, one can see that the glazing 1110 with the glazing mounting member 1200 attached to it can be removed and mounted to the wall 1106 (via the wall mounting member 1112) by removing and securing the fasteners 1400. In one embodiment, the fasteners 1400 have screw threads, and the fastener receiving openings 1452 have threads that mate with the screw threads of the fasteners 1400.

As further shown in FIGS. 5A and 5B, the offset second leg 1228 of the glazing mounting member 1200 provides a space that allows retaining of a sacrificial protective panel 1240 at a position that is inward of the inner surface of the glazing 1110. Such a retaining space can be dimensioned and configured in a number of ways as described below in greater detail. By positioning the sacrificial protective panel 1240 between the glazing 1110 and the interior of the vehicle, the protective panel 1240 can provide protection against vandalism of the relatively expensive glazing 1110 by a passenger in the vehicle.

Figure 6A:
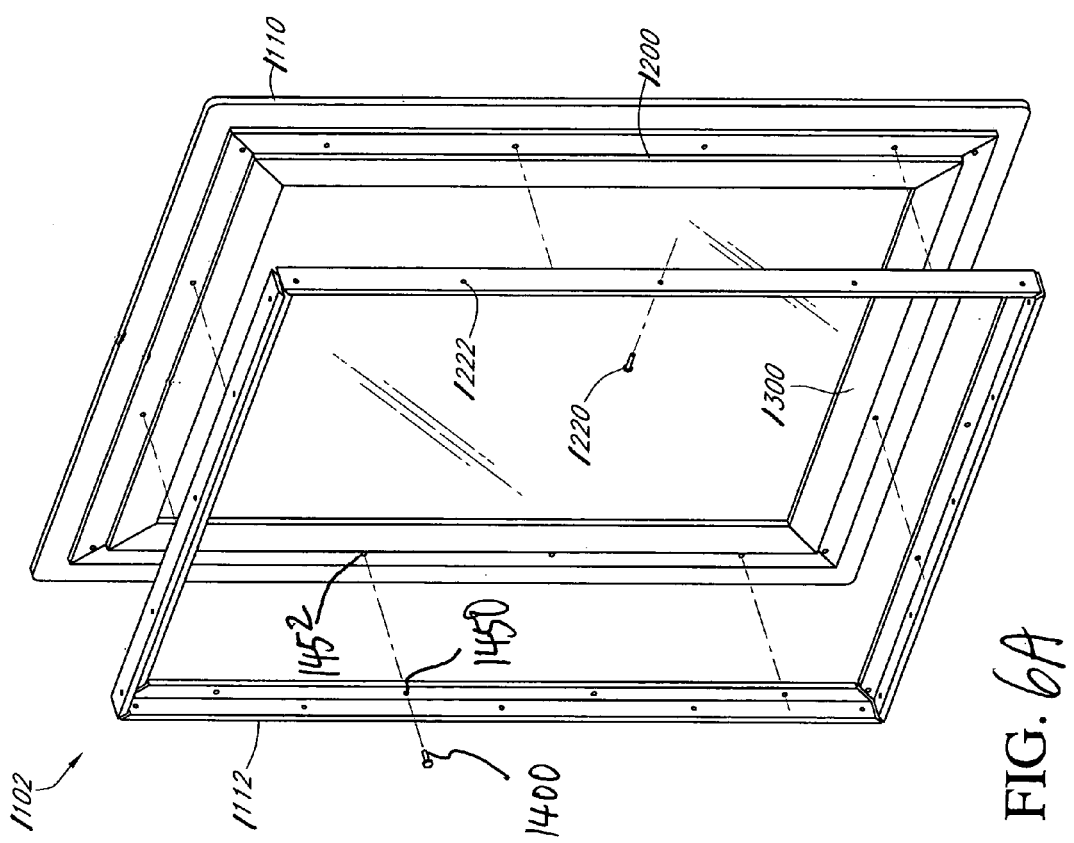
FIG. 6A illustrates a perspective view of one embodiment of a frame mounting member that facilitates mounting of the window assembly of FIGS. 5A and 5B, wherein a locking member is used to secure a sacrificial protective layer adjacent to the glazing.

FIG. 6A shows a perspective view of one embodiment of the window assembly 1102 having one embodiment of the glazing mounting member 1200 and one embodiment of the wall mounting member 1112. The glazing mounting member 1200 is shown to be attached to the glazing 1110, and the one or more fasteners 1400 are shown to extend through the apertures 1450 and received by the openings 1452, so as to interconnect the glazing 1110 to the wall mounting member 1200. The one or more fasteners 1220 are shown to extend through the apertures on the first leg of the wall mounting member 1200, so as to mount the wall mounting member 1200 to the wall (not shown).

In the example embodiment of the window assembly 1102, each of the wall mounting member 1112 and the glazing mounting member 1200 includes four segmented sections that generally form the shape of the glazing (rectangle, for example). In another embodiment, the wall mounting member and/or the glazing mounting member may be formed by one or more pieces. For example, a mounting member (wall mounting or glazing mounting) can be formed as a single piece. In another example, a mounting member can also be formed as two pieces—one covering the three sides, either in "U" (in either upright or inverted) or "C" (either forward facing or reversed), and the other covering the fourth side. Based on the foregoing, it should be readily apparent that the segmentation (or lack thereof) can be implemented in a number of ways.

Figure 6B:
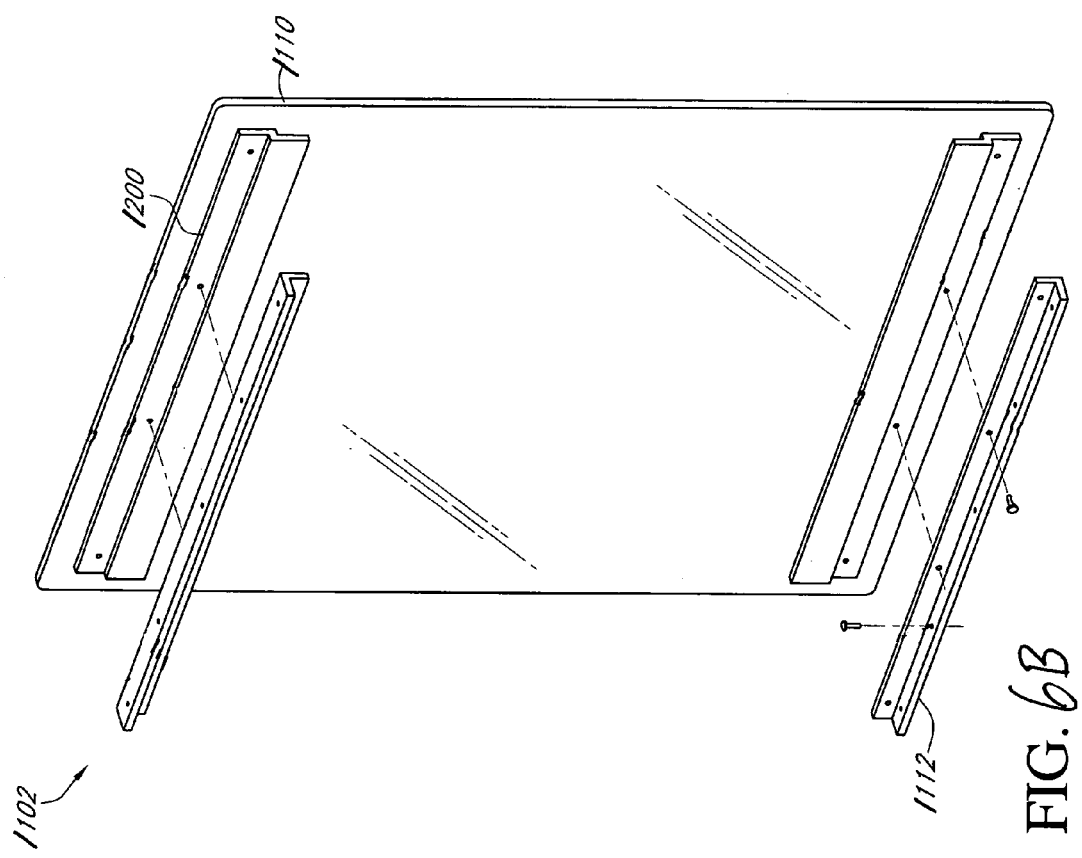
FIG. 6B illustrates a perspective view of another embodiment of the frame mounting member that can facilitate mounting of the window assembly of FIGS. 5A and 5B, wherein the frame mounting member includes at least two frame mounting sections positioned at opposing ends of the window opening so as to allow mounting of at least two retainers.

In one embodiment, the wall mounting member 1112 and/or the glazing mounting member 1200 do not necessarily need to cover all the sides. An example embodiment of the window assembly 1102 having two sections of the wall and glazing mounting members 1112 and 1200 positioned at generally opposing sides, is shown in FIG. 6B. In one embodiment, such as that shown in FIG. 6B, the opposing sides are top and bottom sides. In another embodiment, the opposing sides can be the two vertical sides. Based on the foregoing, the two opposing sides can be oriented in any manner, including the top/bottom and side/side configuration.

Having the glazing mounting member 1200 at the opposing sides allows easy mounting and removal of the sacrificial protective panel to and from the window assembly 1102. Such mounting and removal of the sacrificial protective panel is described below in greater detail.

Figure 6D:
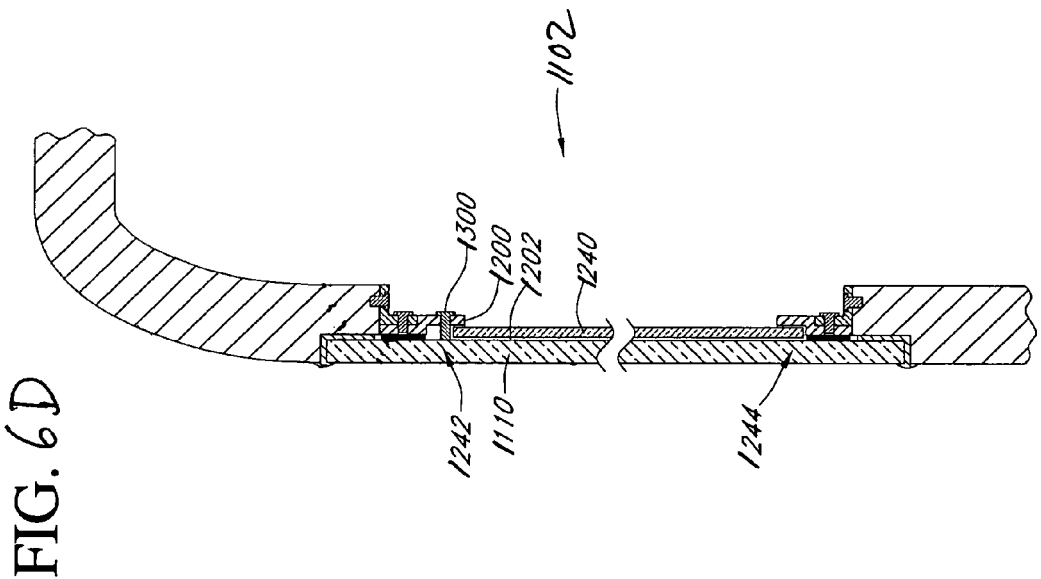
FIGS. 6C and 6D illustrate cross-sectional views of some of the possible variations to the window assembly of FIG. 5A wherein one or more retainers with the locking members are used to secure the sacrificial protective panel adjacent to the glazing.
Figure 6C:
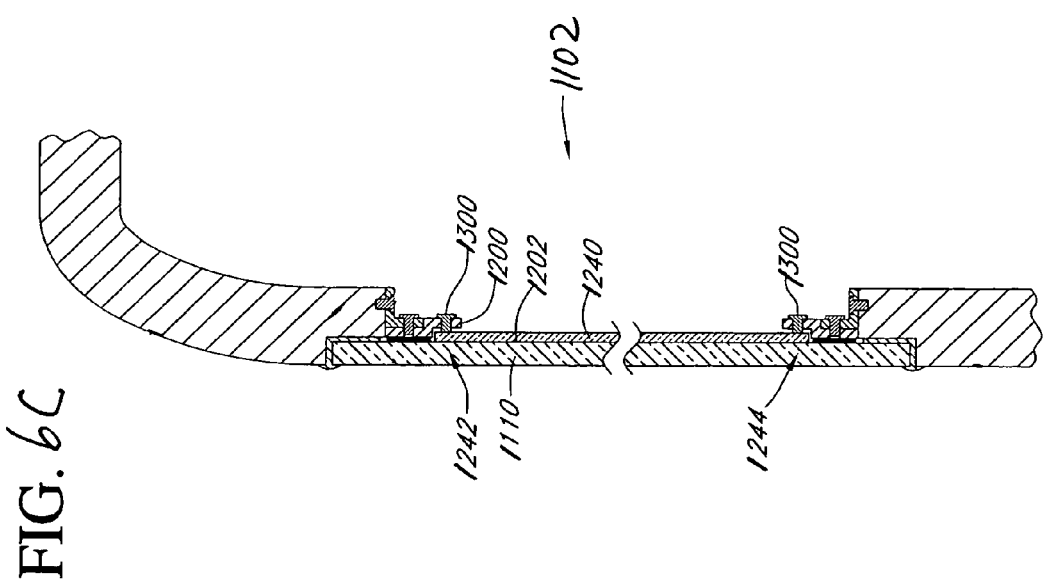

FIGS. 6C and 6D now show that in various embodiments, the window assembly 1102 can includes a locking member 1300 that reduces the range of movement of the sacrificial protective panel 1240. In one embodiment as shown in FIG. 6C, the window assembly includes the glazing mounting member 1200 whose second leg is dimensioned to provide first and second spaces 1242 and 1244 between the second leg and an inner surface 1202 of the glazing 1110. As described above, the glazing mounting member 1200 that defines the first and second spaces 1242 and 1244 can be formed by one or more segments. As shown in FIG. 6C, one or more locking members 1300 are shown to extend through corresponding apertures formed on the second legs to engage the sacrificial protective panel 1240 and urge it against the inner surface 1202 of the glazing 1110, thereby reducing the likelihood of movement of the sacrificial protective panel 1240 relative to the glazing 1110.

In some embodiments, being able to move the sacrificial protective panel 1240 relative to the glazing 1110 may be desirable under certain situations. As an example, sliding of the sacrificial protective panel 1240 relative to the glazing 1110 can allow removal and mounting of the sacrificial protective panel 1240 from and to the retained position in a manner described below in greater detail.

In one embodiment as shown in FIG. 6D, a locking member 1300 can be introduced to the first space 1242 so as to inhibit a first edge of the sacrificial protective panel 1240 from moving further into the first space 1242. The location of such locking member 1300 can be selected so that when present, the locking member 1300 inhibits sliding movement of the sacrificial protective panel which would be sufficient to allow removal of a second edge (opposite from the first edge) from the second space 1244.

As shown in FIG. 6D, the locking member 1300 does not urge the sacrificial protective panel 1240 against the inner surface 1202 of the glazing 1110. Thus, the sacrificial protective panel 1240 may or may not touch the inner surface 1202 of the glazing 1110.

In one embodiment, the locking members 1300 shown in FIGS. 6C and 6D are removable, so as to allow movements of the sacrificial protective member for removal and mounting. In one embodiment, the locking members 1300 include threaded rod members such as screws.

As described above in reference to FIGS. 3D and 6D, the glazing mounting member can be configured to allow sliding movement of the sacrificial protective panel for the purpose of removal and installation. Such a feature of the window assembly is now described in greater detail.

Figures 7A, 7B, 7C:
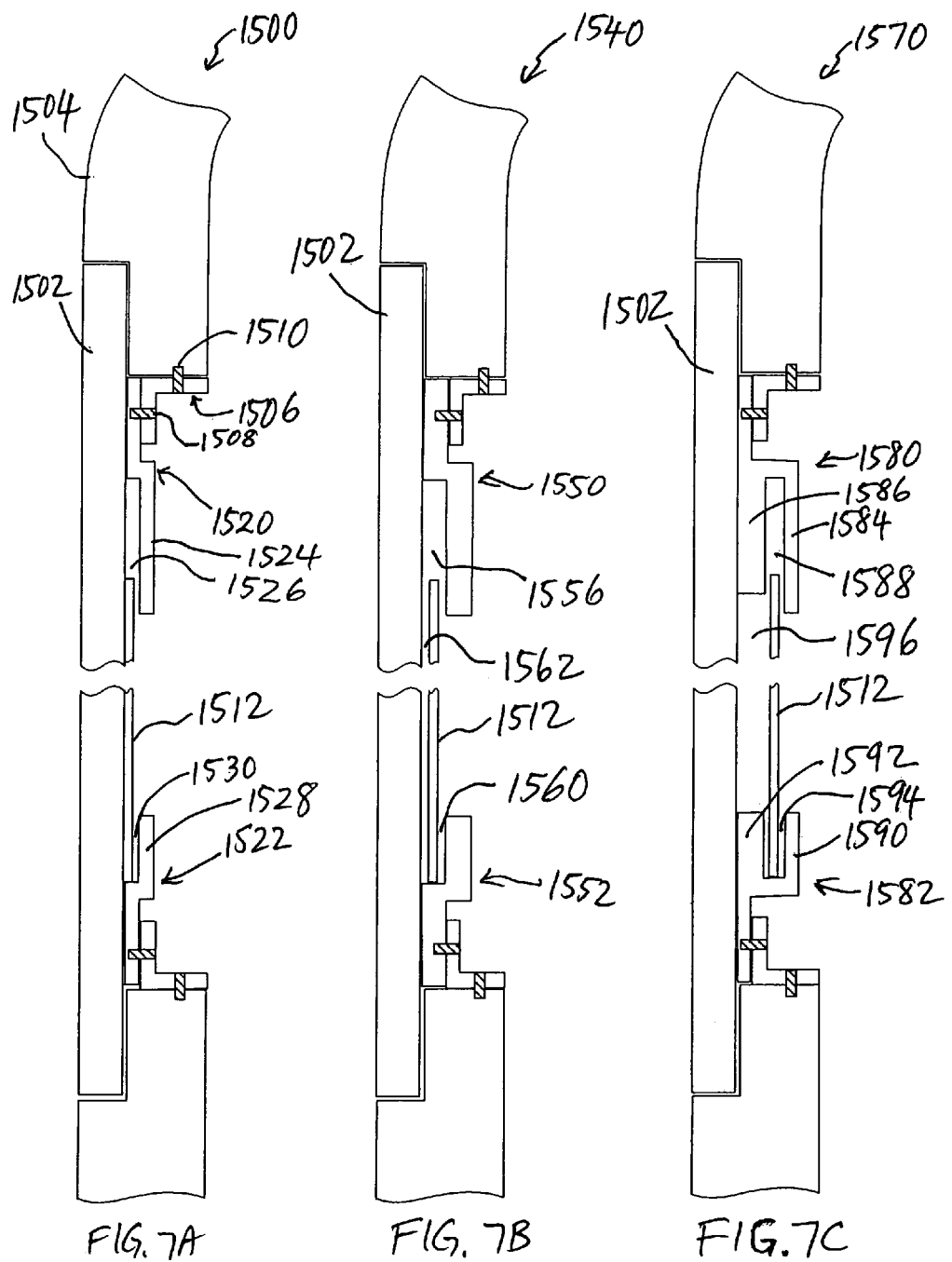
FIGS. 7A–7C illustrate cross-sectional views of various example embodiments of a glazing mounting member that facilitates flush mounting of the glazing and also retain the sacrificial protective panel at a location that is inward from the inner surface of the glazing.

FIGS. 7A–7C now show by examples various embodiments of the window assembly that allows mounting, retaining, and removal of a mounted sacrificial protective panel at a location that is inward from the inner surface of a glazing. FIGS. 8A–8C show by examples various embodiments of the window assembly that are similar to those of FIGS. 7A–7C and having locking members.

FIG. 7A shows one embodiment of a window assembly 1500 that allows a substantially flush mounting of a glazing 1502 to a wall 1504 of a vehicle. The window assembly 1500 includes first and second glazing mounting members 1520 and 1522 that are attached to the inner surface of the glazing 1502. The window assembly 1500 further includes a wall mounting members 1506 that are mounted to the peripheral portion of an opening formed by the wall 1504 via one or more fasteners 1510. In one embodiment, the peripheral portion of the opening includes a recess that is dimensioned to receive the peripheral portion of the glazing 1502 so as to provide a flush mounted contour of the wall 1504 and the glazing 1502.

In one embodiment, the structure of the wall mounting members 1506 and the glazing mounting members 1520 and 1522 are similar to those described above in reference to FIGS. 5–6. Thus, the glazing mounting members 1520 and 1522 are shown to be mounted to the wall mounting members 1506 via fasteners 1508. In one embodiment, the fasteners 1508 are removable to allow removal of the glazing/glazing mounting members (1502, 1520, 1522) combination from the wall/wall mounting members (1504, 1506) combination.

As further shown in FIG. 7A, a second leg 1524 of the glazing mounting member 1520 is dimensioned to define a first space 1526 that is between the second leg 1524 and the inner surface of the glazing 1502. Similarly, a second leg 1528 of the glazing mounting member 1522 is dimensioned to define a second space 1530 that is between the second leg 1528 and the inner surface of the glazing 1502. In one embodiment, the first space 1526 and the second space 1530 are positioned at or about opposing edges of a sacrificial protective panel 1512 so as to allow retaining of the sacrificial protective panel 1512, and also to allow sliding motion of the sacrificial protective panel 1512 for removal and installation in a manner described below.

In one embodiment as shown in FIG. 7A, the second legs 1524 and 1528 of the first and second glazing mounting members 1520 and 1522 can be dimensioned so that the first space 1526 has a dimension that is greater than that of the second space 1530 along a direction that is generally parallel to the glazing 1502. Such a configuration allows a first edge of the sacrificial protective panel 1512 to move into the first space 1526 by a sufficient amount so that a second edge (of the sacrificial protective panel 1512) that is generally opposite from the first edge can be removed from the second space 1530. It will be understood that for various embodiments of the window assembly described herein in reference to FIGS. 7–10, the foregoing relative dimensions of the first and second spaces apply.

In one embodiment, the glazing mounting members 1520 and 1522 are positioned at upper and lower portions of the window assembly, respectively, such that the first space 1526 receives the upper edge of the sacrificial protective panel 1512, and the second space 1530 receives the opposing lower edge of the sacrificial protective panel 1512. In another embodiment, the glazing mounting members 1520 and 1522 are positioned at two side portions of the window assembly, such that the first space 1526 receives one side edge of the sacrificial protective panel 1512, and the second space 1530 receives the opposing other edge of the sacrificial protective panel 1512. Based on the foregoing, one can see that the first and second spaces 1526 and 1530 can be positioned generally opposite from each other in any orientation, including the example upper-lower and side—side configurations. It will be understood that for various embodiments of the window assembly described herein in reference to FIGS. 7–10, the foregoing possible configurations of the first and second spaces apply.

It will also be understood that various embodiments of glazing mounting members (for example, 1520 and 1522 in FIG. 7A) that at least partially define their corresponding first and second spaces (for example, 1526 and 1530 in FIG. 7A), described herein in reference to FIGS. 7–10, can be formed as one or more pieces in a manner similar to that described above in reference to FIGS. 6A and 6B.

For the purpose of description, various embodiments of the glazing mounting member and the wall mounting member may be referred to in terms of sections. For example, first and second sections of the glazing mounting member refers to the two opposing portions of the glazing mounting member, whether or not the glazing mounting member is formed from a single piece or from a plurality of pieces, and whether or not the one or more pieces are segmented. Also for example, first and second sections of the wall mounting member refers to the two opposing portions of the wall mounting member that correspond to their respective glazing mounting sections, whether or not the wall mounting member is formed from a single piece or from a plurality of pieces, and whether or not the one or more pieces are segmented.

For the purpose of description, depths of first and second spaces represent dimensions of the first and second spaces along a direction that is generally parallel to the sacrificial protective panel. Similarly, widths of the first and second spaces represent dimensions of the first and second spaces along a direction that is generally perpendicular to the sacrificial protective panel. The foregoing dimensional definitions of the first and second spaces apply to the description in reference to FIGS. 7–10.

FIG. 7A shows that the first and second spaces 1526 and 1530 can have a width so that the sacrificial protective panel 1512, when retained therein, is either in contact, close to being in contact, or partially in contact with the inner surface of the glazing 1502.

FIG. 7B shows another example embodiment of a window assembly 1540 having glazing mounting members 1550 and 1552 that define first and second spaces 1556 and 1560 in a similar manner as that of FIG. 7A. In one embodiment that is similar to FIG. 7A, the first space 1556 has a first depth that is greater than a second depth of the second space 1560 to allow sliding motion of the sacrificial protective panel 1512 for the purpose of removal and installation. In the example embodiment of the window assembly 1540, however, the first and second spaces 1556 and 1560 have a width that allows retaining of the sacrificial protective panel 1512 so as to provide a gap 1562 between the panel 1512 and the inner surface of the glazing 1502. In one embodiment, such a gap can be facilitated and maintained by an insert (not shown) positioned within the first and second spaces 1556, 1560, and between the panel 1512 and the inner surface of the glazing 1502.

FIG. 7C shows yet another example embodiment of a window assembly 1570 having glazing mounting members 1580 and 1582 that define first and second spaces 1588 and 1594. In one embodiment, the first space 1588 has a first depth that is greater than a second depth of the second space 1594 to allow sliding motion of the sacrificial protective panel 1512 for the purpose of removal and installation.

In the example embodiment of the window assembly 1570, the glazing mounting member 1580 includes a second leg 1584 that is offset from a first leg (that couples the glazing to corresponding wall mounting member) in a manner that is generally similar to that of FIG. 7B. Similarly, the glazing mounting member 1582 includes a second leg 1590 that is offset from a first leg (that couples the glazing to a corresponding wall mounting member) in a manner that is generally similar to that of FIG. 7B.

As shown in FIG. 7C, the glazing mounting member 1580 further includes a third leg 1586 that is interposed between the second leg 1584 and the glazing 1502. Similarly, the glazing mounting member 1582 further includes a third leg 1592 that is interposed between the second leg 1590 and the glazing 1502.

Thus, in one embodiment as shown in FIG. 7C, the first and second spaces 1588 and 1594 are at least partially separated by the respective third legs 1586 and 1592. In one embodiment, the third legs 1586 and 1592 can provide a gap 1596 between the sacrificial protective panel 1512 and the inner surface of the glazing 1502.

As described above in reference to FIGS. 7A to 7C, the sacrificial protective panel can be retained so as to at least partially touch the glazing, or be offset from the glazing by a gap. Such different configurations may be desirable for different applications in vehicle window assemblies. For example, having the sacrificial protective panel in contact with the glazing may be advantageous when deformation of the panel due to touching is not desired. In another example, having a gap between the sacrificial protective panel and the glazing may be advantageous in certain climate conditions where having an air gap is desirable. Whatever the configuration may be, it will be understood that the functionality of the first and second spaces, for the purpose of retaining, removal, and/or installation of the sacrificial protective panel, generally does not depend on such a gap, or lack thereof.

FIGS. 8A–8C now show by examples various embodiments of the window assembly having locking members that inhibit movement of the sacrificial protective panel into their respective first spaces. For the purpose of description, the example embodiments shown in FIGS. 8A–8C are similar (other than the locking members) to the example embodiments described above in reference to FIGS. 7A–7C.

FIG. 8A shows one embodiment of a window assembly 1600 having a glazing mounting member 1610 that defines a first space 1612. As shown, the example window assembly 1600 further includes a locking member 1614 that extends into the first space 1612 at a location near the first edge of the sacrificial protective panel. In a manner similar to that described above in reference to FIG. 6D, the locking member 1614 inhibits motion of the sacrificial protective panel deeper into the first space 1612, thereby reducing the likelihood of an unauthorized removal of the sacrificial protective panel. In one embodiment, the locking member 1614 is a removable fastener such as a set screw.

FIG. 8B shows one embodiment of a window assembly 1620 having a glazing mounting member 1630 that defines a first space 1632. As shown, the example window assembly 1620 further includes a locking member 1634 that extends into the first space 1632 at a location near the first edge of the sacrificial protective panel. In a manner similar to that described above in reference to FIG. 6D, the locking member 1634 inhibits motion of the sacrificial protective panel deeper into the first space 1632, thereby reducing the likelihood of an unauthorized removal of the sacrificial protective panel. In one embodiment, the locking member 1634 is a removable fastener such as a set screw. In one embodiment, the locking member 1634 is longer than the locking member 1614 of FIG. 8A, to accommodate the greater width (in a situation where the sacrificial protective panels have a substantially same thickness) of the first space 1632.

FIG. 8C shows one embodiment of a window assembly 1640 having a glazing mounting member 1650 that defines a first space 1652. As shown, the example window assembly 1640 further includes a locking member 1654 that extends into the first space 1652 at a location near the first edge of the sacrificial protective panel. In a manner similar to that described above in reference to FIG. 6D, the locking member 1654 inhibits motion of the sacrificial protective panel deeper into the first space 1652, thereby reducing the likelihood of an unauthorized removal of the sacrificial protective panel. In one embodiment, the locking member 1654 is a removable fastener such as a set screw. In one embodiment, the locking member 1654 extends into the first space 1652 and engages the third leg of the glazing mounting member 1650.

FIGS. 9A and 9B now show one embodiment of a window assembly 1660 having a movement resisting member 1674 that is a variation to the locking member described above in reference to FIGS. 8A–8C. As shown in FIG. 9A, the window assembly 1660 includes a glazing mounting member 1670 that defines a first space 1672 that receives the first edge of the sacrificial protective panel 1512. As further shown in FIGS. 9A and 9B, the window assembly 1660 further includes the movement resisting member 1674 disposed within the first space 1672, that resists the movement of the sacrificial protective panel 1512 deeper into the first space 1672.

In one embodiment as shown in FIG. 9B, the movement resisting member 1674 can be, for example, a leaf-type spring that is positioned in the first space 1672. In one embodiment, the spring 1674 is captured in the first space 1672 between the first edge of the sacrificial protective panel 1512 and the deep end of the first space 1672. When the panel 1512 is in a retained configuration, its first edge may or may not be in contact with the spring 1674. When the panel 1512 is moved (authorized or unauthorized) into the first space 1672, as indicated by an arrow 1676, the first edge of the panel 1512 engages the spring 1674. Further movement of the panel 1512 can restorably deform the spring 1674, such that the spring 1674 exerts a restorative force in a direction having a component that is opposite (as indicated by an arrow 1678) from the movement direction 1676. One can see that such a movement resisting member can reduce the likelihood of an unauthorized removal of the sacrificial protective panel. For someone performing an authorized removal, an extra force along the movement direction 1676 can yield a sufficient movement into the first space 1672 to allow the second edge of the panel to be removed from the second space.

Figures 10A, 10B, 10C:
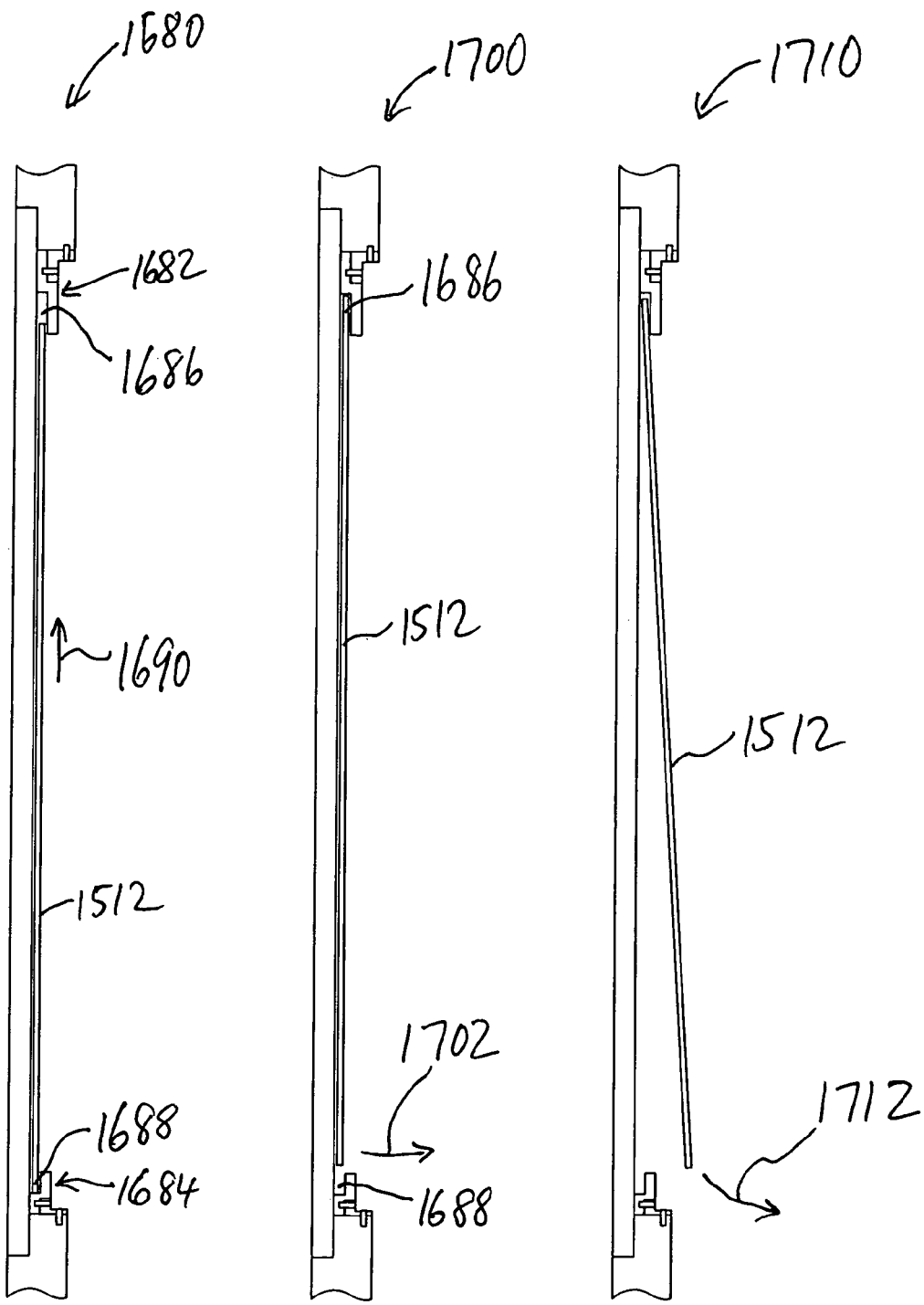
FIGS. 10A–10C show by example how the sacrificial protective panel can be retained by, removed from, and installed to, various embodiments of the glazing mounting member.

FIGS. 10A–10C now show by example how the sacrificial protective panel 1512 can be retained by, removed from, and installed to an example glazing mounting members 1682 and 1684. The glazing mounting member 1682 defines a first space 1686, and the glazing mounting member 1684 defines a second space 1688. For the purpose of describing such a process, the example glazing mounting members 1682 and 1684 can be any one of, or some variations of, the example embodiments described above in reference to FIGS. 7–9.

For the example embodiments (FIGS. 8A–8C) having locking members, it will be assumed that the locking members have been removed. For the example embodiment having a movement resisting member (FIGS. 9A–9B), the movement resisting member is now shown.

As shown in a retained configuration 1680 of FIG. 10A, the first and second edges of the sacrificial protective panel 1512 are shown to be respectively retained within the first and second spaces 1686 and 1688. To remove the panel 1512 from the retaining first and second spaces 1686 and 1688, one can move the panel 1512 along a first direction 1690 such that the first edge of the panel 1512 moves deeper into the first space 1686.

FIG. 10B shows a partially removed configuration 1700, where the panel 1512 has been moved sufficiently deep into the first space 1686 so as to allow movement of the second edge of the panel 1512 away from the glazing, as indicated by an arrow 1702. In one embodiment, the movement of the panel 1512 into the first space 1686 is by a first amount that is sufficient to allow the second edge of the panel 1512 to clear the lip of the panel-retaining leg (described as the second leg above) without the 1512 being substantially flexed. In another embodiment, the panel 1512 may be moved into the first space 1686 by an amount that is less than the first amount; and clearing of the second edge of the panel 1512 past the lip of the panel-retaining leg can then be achieved by flexing the panel 1512.

FIG. 10C shows a configuration 1710 where the second edge of the panel 1512 has cleared the lip of the panel-retaining leg of the glazing mounting member 1684. The second edge of the panel 1512 can then be moved in a direction 1712 to extract the first edge of the panel 1512 out of the first space 1686 and the second edge of the panel 1512 further away from the glazing.

Installation of a replacement sacrificial panel can be achieved by a substantially reverse process as that described above in reference to FIGS. 10A–10C. For example, the first edge of the replacement panel can be inserted into the first space 1686 in a motion that is generally opposite in direction as the direction 1712 of FIG. 10C. Once the first edge of the panel 1512 is moved into the first space 1686 by a sufficient amount, the second edge of the panel 1512 can be moved towards the glazing in a motion that is generally opposite in direction as the direction 1702 of FIG. 10B. Once the second edge of the panel 1512 is in a position that allows it to move into the second space 1688, the second edge of the panel 1512 can be moved into the second space 1688 in a motion that is generally opposite in direction as the direction 1690 of FIG. 10A. The first and second edges of the glazing 1512 are now retained within the first and second spaces 1686 and 1688.

Based on the description herein, one can see that the various embodiments of the glazing mounting member can be mounted to the inner surface of the glazing. Such mounting allows for a relatively quick replacement of the glazing, and also provides the outer surface of the glazing substantially free of mounting structures, thereby allowing flush mounting of the glazing relative to the outer surface of the wall of the vehicle. As described above, some embodiments of the window assembly may include one or more sealing components, such components can be dimensioned and formed so as to not significantly detract from the flush-fit appearance of the window assembly.

Also based on the foregoing description in reference to FIGS. 7–10, one can also see that various embodiments of the window assembly having the aforementioned advantageous features to also have the option of a sacrificial protective panel retaining feature. Such a retaining feature allows one utilize the sacrificial protective panel in an advantageous manner to thereby protect the glazing.

Although the foregoing description has shown, described and pointed out the fundamental novel features of the invention, it will be understood that various omissions, substitutions, and changes in the form of the detail of the apparatus as illustrated, as well as the uses thereof, may be made by those skilled in the art, without departing from the spirit or scope of the present invention. Consequently, the scope of the invention should not be limited to the foregoing discussion, but should be defined by the appended claims.

The invention claimed is:

1. A window assembly for a vehicle having a window opening formed in a wall that has an outer surface, the assembly comprising:
   a glazing having an inner surface and an outer surface, wherein the glazing is sized to fit within the window opening such that the outer surface of the glazing is substantially flush with the outer surface of the wall, and wherein the glazing has a first edge and a second edge that is generally opposite from the first edge;
   a wall mounting member that includes a first section that is proximate the first edge of the glazing, and a second section that is proximate the second edge of the glazing, wherein the wall mounting member is attached coupled to the wall;
   a glazing mounting member that includes a first section and a second section that is generally opposite to the first section, wherein the glazing mounting member is coupled to the inner surface of the glazing, wherein the first and second sections of the glazing mounting member is removably coupled to the wall mounting member thereby allowing the glazing to be removably mounted to the wall, and wherein the first section defines a first space having a first depth, and the second section defines a second space having a second depth, said first and second depths being along a direction having a component that is substantially parallel to the inner surface of the glazing;
   a sacrificial protective panel having a first edge and a second edge that is generally opposite from the first edge, wherein the sacrificial protective panel is sized such that the first and second edges of the sacrificial protective panel are respectively retained in the first and second spaces such that the sacrificial protective panel is positioned inward of the inner surface of the glazing;
   wherein the first and second depths are selected such that when the sacrificial protective panel is retained therein, the first edge of the sacrificial protective panel is able to move deeper into the first space by an amount sufficient to allow the second edge of the sacrificial protective panel to be removed from the second space.

2. The assembly of claim 1, wherein the first edge of the glazing comprises an upper edge of the glazing, and the second edge of the glazing comprises a lower edge of the glazing.

3. The assembly of claim 1, wherein the first section of the glazing mounting member comprises:
   a first leg that extends substantially parallel to the glazing and attaches to the inner surface of the glazing, wherein the first leg extends substantially parallel to the glazing and attaches to the inner surface of the glazing; and
   a second leg that is offset inward from the first leg and extends substantially parallel to the glazing such that the second leg defines the first space having the first depth between the second leg and the inner surface of the glazing.

4. The assembly of claim 3, wherein the second section of the glazing mounting member comprises:
   a first leg that extends substantially parallel to the glazing and attaches to the inner surface of the glazing, wherein the first leg extends substantially parallel to the glazing and attaches to the inner surface of the glazing; and
   a second leg that is offset inward from the first leg and extends substantially parallel to the glazing such that the second leg defines the second space having the second depth between the second leg and the inner surface of the glazing.

5. The assembly of claim 4, wherein the first depth is greater than the second depth, thereby allowing the first edge of the sacrificial protective panel to move deeper into the first space to allow removal of the second edge of the sacrificial protective panel from the second space.

6. The assembly of claim 4, wherein the first and second spaces are bounded by the inner surface of the glazing and the respective second legs of the first and second sections of the glazing mounting member.

7. The assembly of claim 4, wherein each of the first and second sections of the glazing mounting member comprises a third leg that extends substantially parallel to the glazing and interposed between the respective second leg and the inner surface of the glazing.

8. The assembly of claim 1, wherein the sacrificial protective panel is in contact with the inner surface of the glazing.

9. The assembly of claim 1, wherein the sacrificial protective panel is not in contact with the inner surface of the glazing.

* * * * *